United States Patent
Ohta et al.

(10) Patent No.: US 10,693,619 B2
(45) Date of Patent: *Jun. 23, 2020

(54) DEVICE, SYSTEM AND METHOD FOR DATA COMMUNICATIONS IN A WIRELESS NETWORK

(71) Applicant: FUJITSU LIMITED, Kawasaki-shi, Kanagawa (JP)

(72) Inventors: Yoshiaki Ohta, Yokohama (JP); Yoshihiro Kawasaki, Kawasaki (JP); Yoshinori Tanaka, Yokohama (JP); Shinichiro Aikawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,385

(22) Filed: Jul. 3, 2018

(65) Prior Publication Data

US 2018/0316480 A1    Nov. 1, 2018

Related U.S. Application Data

(63) Continuation of application No. PCT/JP2016/050657, filed on Jan. 12, 2016.

(51) Int. Cl.
*H04W 4/00* (2018.01)
*H04L 5/00* (2006.01)
(Continued)

(52) U.S. Cl.
CPC .......... *H04L 5/0094* (2013.01); *H04L 1/0003* (2013.01); *H04L 1/0009* (2013.01);
(Continued)

(58) Field of Classification Search
CPC ..... H04L 5/0094; H04L 1/0003; H04L 29/08; H04W 80/02; H04W 72/04
See application file for complete search history.

(56) References Cited

U.S. PATENT DOCUMENTS

2006/0292992 A1    12/2006    Tajima et al.
2010/0074215 A1    3/2010    Park et al.
(Continued)

FOREIGN PATENT DOCUMENTS

EP    1 959 693 A1    8/2008
EP    2 681 865        1/2014
(Continued)

OTHER PUBLICATIONS

Extended European search report with supplementary European search report and the European search opinion issued by the European Patent Office for corresponding European Patent Application No. 16884870.3, dated Nov. 6, 2018.
(Continued)

*Primary Examiner* — Abdelnabi O Musa
(74) *Attorney, Agent, or Firm* — Myers Wolin, LLC

(57) ABSTRACT

A radio communication device includes: a communication circuit configured to transmit and receive a signal to and from first radio communication device; and a control circuit configured to cause the communication circuit to receive a first signal in a first layer, the first signal being configured to include data in a second layer different from the first layer, and cause the communication circuit to transmit, through a first radio resource on a shared channel, acknowledgement information when the first signal from the first radio communication device is received, the first radio resource being selected from among the shared channel without scheduling information from the first communication device, the acknowledge information indicating whether the data in the second layer is normally received from the first radio communication device.

20 Claims, 21 Drawing Sheets

(51) Int. Cl.
H04W 72/04 (2009.01)
H04L 29/08 (2006.01)
H04L 1/00 (2006.01)
H04W 80/02 (2009.01)

(52) U.S. Cl.
CPC ............ *H04L 5/0048* (2013.01); *H04L 29/08* (2013.01); *H04W 72/04* (2013.01); *H04W 80/02* (2013.01)

(56) References Cited

U.S. PATENT DOCUMENTS

| | | |
|---|---|---|
| 2011/0128931 A1 | 6/2011 | Ishii et al. |
| 2012/0082145 A1 | 4/2012 | Chen et al. |
| 2013/0016672 A1 | 1/2013 | Yang et al. |
| 2013/0022011 A1 | 1/2013 | Enomoto et al. |
| 2013/0083753 A1 | 4/2013 | Lee et al. |
| 2013/0242894 A1 | 9/2013 | Kikuchi |
| 2014/0133447 A1 | 5/2014 | Moulsley et al. |
| 2014/0177565 A1 | 6/2014 | Zeira et al. |
| 2014/0355539 A1 | 12/2014 | Yang et al. |
| 2015/0110034 A1 | 4/2015 | Yang et al. |
| 2015/0208386 A1 | 7/2015 | Yang et al. |
| 2016/0050054 A1* | 2/2016 | Wager ............... H04L 5/0035 455/450 |
| 2016/0302219 A1 | 10/2016 | Nihei |
| 2016/0366682 A1* | 12/2016 | Tseng ............... H04W 72/04 |
| 2018/0070367 A1* | 3/2018 | Fujishiro ............ H04W 72/12 |
| 2018/0145796 A1 | 5/2018 | Liang et al. |
| 2018/0295608 A1 | 10/2018 | Nguyen et al. |
| 2018/0332577 A1 | 11/2018 | Yang et al. |

FOREIGN PATENT DOCUMENTS

| | | |
|---|---|---|
| EP | 3 065 452 A1 | 9/2016 |
| JP | 8-242200 A | 9/1996 |
| JP | 2007-6080 A | 1/2007 |
| JP | 2009-164816 A | 7/2009 |
| JP | 2009-290615 A | 12/2009 |
| JP | 2011-511528 A | 4/2011 |
| JP | 2013-514717 A | 4/2013 |
| JP | 2013-529412 A | 7/2013 |
| JP | 2013-197829 A | 9/2013 |
| JP | 2014-522205 A | 8/2014 |
| JP | 2014-531856 A | 11/2014 |
| JP | 2015-501116 A | 1/2015 |
| JP | 2015-80278 A | 4/2015 |
| JP | 2015-513273 A | 4/2015 |
| JP | 2015-88992 A | 5/2015 |
| WO | 2007/117888 A2 | 10/2007 |
| WO | 2012/118356 A2 | 9/2012 |
| WO | 2013/138043 A1 | 9/2013 |
| WO | 2014/191050 A1 | 12/2014 |
| WO | 2015/098102 A1 | 7/2015 |

OTHER PUBLICATIONS

3GPP TS 36.300 V12.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2015.
3GPP TS 36.211 V12.5.0, "3rd Generation Partnership Project; Technical Specification Group Radio Access Network; Evolved Universal Terrestrial Radio Access (E-UTRA); Physical channels and modulation (Release 12)", Mar. 2015.
3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)", Mar. 2015.
3GPP TS 36.213 V12.5.0, "3rd Generation Partnership Project; Technical Specification Group Radio Access Network; Evolved Universal Terrestrial Radio Access (E-UTRA); Physical layer procedures (Release 12)", Mar. 2015.
3GPP TS 36.321 V12.5.0, "3rd Generation Partnership Project; Technical Specification Group Radio Access Network; Evolved Universal Terrestrial Radio Access (E-UTRA); Medium Access Control (MAC) protocol specification (Release 12)", Mar. 2015.
3GPP TS 36.322 V12.2.0, "3rd Generation Partnership Project; Technical Specification Group Radio Access Network; Evolved Universal Terrestrial Radio Access (E-UTRA); Radio Link Control (RLC) protocol specification (Release 12)", Mar. 2015.
3GPP TS 36.323 V12.3.0, "3rd Generation Partnership Project; Technical Specification Group Radio Access Network; Evolved Universal Terrestrial Radio Access (E-UTRA); Packet Data Convergence Protocol (PDCP) specification (Release 12)", Mar. 2015.
3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification (Release 12)", Mar. 2015.
3GPP TS 36.413 V12.5.0, "3rd Generation Partnership Project; Technical Specification Group Radio Access Network; Evolved Universal Terrestrial Radio Access Network (E-UTRAN); S1 Application Protocol (S1AP) (Release 12)", Mar. 2015.
3GPP TS 36.423 V12.5.0, "3rd Generation Partnership Project; Technical Specification Group Radio Access Network; Evolved Universal Terrestrial Radio Access Network (E-UTRAN); X2 application protocol (X2AP) (Release 12)", Mar. 2015.
3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013.
Information Sciences Institute, "Transmission Control Protocol", RFC793, Darpa Internet Program, Protocol Specification, Sep. 1981.
International Search Report with Written Opinion of the International Searching Authority issued by the Japan Patent Office for corresponding International Patent Application No. PCT/JP2016/050657, dated Feb. 23, 2016, with a partial English translation.
Ericsson et al., "On the use of aperiodic and periodic CSI feedback and the impact on periodic CSI dropping", Agenda Item: 7.2.1.2.1, 3GPP TSG-RAN WG1 Meeting #68bis, R1-121010, Jeju, Republic of Korea, Mar. 26-30, 2012.
Nokia Siemens Networks et al., "On remaining details for PUSCH multiple antenna transmission", Agenda Item: 6.2.3, 3GPP TSG-RAN WG1 Meeting #63bis, R1-110438, Dublin, Ireland, Jan. 17-21, 2011.
Notification of Reasons for Refusal issued by the Japan Patent Office for corresponding Japanese Patent Application No. 2017-561082, dated May 21, 2019, with an English translation.
Non-final Office Action issued by the United States Patent and Trademark Office for corresponding U.S. Appl. No. 16/021,912 (that is related to U.S. Appl. No. 16/026,385), dated Jul. 10, 2019.
Decision of Refusal issued by the Japan Patent Office for corresponding Japanese Patent Application No. 2017-561083, dated Dec. 10, 2019, with an English translation.
Notice of Reasons for Refusal issued for corresponding Japanese Patent Application No. 2017-561082, dated Aug. 6, 2019 with full English Machine Translation.
Decision of Refusal issued by the Japan Patent Office for corresponding Japanese Patent Application No. 2017-561082, dated Nov. 19, 2019, with an English translation.
Communication pursuant to Article 94(3) EPC issued for corresponding European Patent Application No. 16884871.1, dated Oct. 2, 2019.
International Search Report with Written Opinion of the International Searching Authority issued by the Japanese Patent Office for corresponding International Patent Application No. PCT/JP2016/050658, dated Feb. 23, 2016, with a partial English translation.
3GPP TS 36.213 V13.0.0, "3 Generation Partnership Project; Technical Specification Group Radio Access Network; Evolved Universal Terrestrial Radio Access (E-ULTRA); Physical Layer procedures (Release 13)", Jan. 5, 2016, XP051047451, pp. 225-299. EESR dated Nov. 22, 2018 for corresponding European Patent Application No. 16884871.1.

(56) References Cited

OTHER PUBLICATIONS

Extended European search report with supplementary European search report and the European search opinion issued by the European Patent Office for corresponding European Patent Application No. 16884871.1, dated Nov. 22, 2018.
Communication pursuant to Article 94(3) EPC issued by the European Patent Office for corresponding European Patent Application No. 16 884 870.3-1218, dated Feb. 12, 2020.
Non-Final Office Action issued by the United States Patent and Trademark Office for corresponding U.S. Appl. No. 16/021,912, dated Feb. 21, 2020.
Reconsideration Report by Examiner before Appeal issued by the Japan Patent Office for corresponding Japanese Datent Application No. 2017-561083 dated Apr. 28, 2020, with English Machine Translation attached.

\* cited by examiner

| COMPONENT | DESCRIPTION | TIME [ms] |
|---|---|---|
| S11 | AVERAGE DELAY TO NEXT SR OPPORTUNITY (5ms PUCCH CYCLE) | 2.5 |
| S12 | UE SENDS SCHEDULING REQUEST | 1 |
| S13 | eNB DECODES SCHEDULING REQUEST AND GENERATES THE SCHEDULING GRANT | 3 |
| S14 | TRANSMISSION OF SCHEDULING GRANT | 1 |
| S15 | UE PROCESSING DELAY (DECODING OF SCHEDULING GRANT + L1 ENCODING OF UL DATA) | 3 |
| S16 | TRANSMISSION OF UL DATA | 1 |
|  | TOTAL DELAY | 11.5 |

Nagle - DELAY ACK PROBLEM

DEVICE, SYSTEM AND METHOD FOR DATA COMMUNICATIONS IN A WIRELESS NETWORK

CROSS-REFERENCE TO RELATED APPLICATION

This application is a continuation application of International Application No. PCT/JP2016/050657, filed on Jan. 12, 2016 and designated the U.S., the entire contents of which are incorporated herein by reference.

FIELD

The present invention relates to a radio communication device, a radio communication system, and a radio communication method.

BACKGROUND

At present, specifications of Long Term Evolution (LTE) systems or LTE-Advanced (LTE-A) which are based on LTE systems have been completed or examined in 3rd Generation Partnership Project (3GPP) which is a standardization organization. In LTE, Release 12 is drawn up from 3GPP Release 8 as an international specification. After 3GPP Release 10, LTE is called LTE-A. Further, 5th generation (5G) mobile communication which is subsequent to 4th generation (4G) mobile communication has also been started to be examined since 2013.

On the other hand, in data communication, a communication protocol called Transmission Control Protocol/Internet Protocol (TCP/IP) is used in some cases. TCP/IP is, for example, a protocol in which TCP and IP are combined and is used as a standard protocol in the Internet or the like. For example, IP is a communication protocol used to relay packets in the Internet. TCP is a transmission control protocol and is a protocol that provides a communication service in an intermediate layer between an application program and IP.

In TCP, a transmission side transmits TCP data, and a reception side responds with TCP acknowledgement (ACK) when the reception side can normally receive TCP data, and the transmission side receives the TCP ACK and starts transmitting subsequent TCP data. In this way, in TCP, a procedure of "TCP data transmission→TCP ACK response" is regulated. Thus, reliable communication is realized.

Examples of the related art include Non-Patent Literature 1 [3GPP TS36.300 V12.5.0 (2015-03)], Non-Patent Literature 2 [3GPP TS36.211 V12.5.0 (2015-03)], Non-Patent Literature 3 [3GPP TS36.212 V12.4.0 (2015-03)], Non-Patent Literature 4 [3GPP TS36.213 V12.5.0 (2015-03)], Non-Patent Literature 5 [3GPP TS36.321 V12.5.0 (2015-03)], Non-Patent Literature 6 [3GPP TS36.322 V12.2.0 (2015-03)], Non-Patent Literature 7 [3GPP TS36.323 V12.3.0 (2015-03)], Non-Patent Literature 8 [3GPP TS36.331 V12.5.0 (2015-03)], Non-Patent Literature 9 [3GPP TS36.413 V12.5.0 (2015-03)], Non-Patent Literature 10 [3GPP TS36.423 V12.5.0 (2015-03)], Non-Patent Literature 11 [3GPP TR36.842 V12.0.0 (2013-12)], and Non-Patent Literature 12 [RFC793].

Examples of the related art include Japanese National Publication of International Patent Application No. 2015-501116 and Japanese Laid-open Patent Publication No. 2009-164816.

SUMMARY

According to an aspect of the invention, a radio communication device includes: a communication circuit configured to transmit and receive a signal to and from first radio communication device; and a control circuit configured to cause the communication circuit to receive a first signal in a first layer, the first signal being configured to include data in a second layer different from the first layer, and cause the communication circuit to transmit, through a first radio resource on a shared channel, acknowledgement information when the first signal from the first radio communication device is received, the first radio resource being selected from among the shared channel without scheduling information from the first communication device, the acknowledge information indicating whether the data in the second layer is normally received from the first radio communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

One disclosure provides a radio communication device, a radio communication system, and radio communication method capable of shortening a delay time taken to transmit TCP ACK.

Further, one disclosure provides a radio communication device, a radio communication system, and a radio communication method capable of improving throughput of TCP.

Hereinafter, embodiments will be described in detail with reference to the drawings. Problems and embodiments of the present specification are exemplary and do not limit the scope of the rights of the present application. In particular, when the expressions are the same technically despite differences in the expressions of the description, the technology of the present application can be applied despite the different expressions and does not limit the scope of the rights.

As terms used in the present specification or technical content described in the present specification, terms or technical content described in the specification may be appropriately used as a standard of communication in 3GPP or the like. As examples of the specification, there are NPLs 1 to 12 described above.

For NPLs 1 to 11 described above, the non-patent literatures described above may be used, but are frequently updated day by day. Thus, terms or technical content described in NPLs 1 to 11 issued immediately before the present application was filed may be appropriately used in the specification of the present application.

An overview of each of NPLs 1 to 12 is as follows.

That is, NPL 1 (3GPP TS36.300 V12.5.0 (2015-03)) describes, for example, an overall specification of LTE-A.

NPL 2 (3GPP TS36.211 V12.5.0 (2015-03)) describes, for example, the specification of a physical layer (PHY) channel (or a physical channel) of LTE-A.

NPL 3 (3GPP TS36.212 V12.4.0 (2015-03)) describes, for example, the specification of PHY encoding of LTE-A.

NPL 4 (3GPP TS36.213 V12.5.0 (2015-03)) describes, for example, the specification of a PHY procedure of LTE-A.

NPL 5 (3GPP TS36.321 V12.5.0 (2015-03)) describes, for example, the specification of medium access control (MAC) of LTE-A.

NPL 6 (3GPP TS36.322 V12.2.0 (2015-03)) describes, for example, the specification of radio link control (RLC) of LTE-A.

NPL 7 (3GPP TS36.323 V12.3.0 (2015-03)) describes, for example, the specification of the packet data convergence protocol (PDCP) of LTE-A.

NPL 8 (3GPP TS36.331 V12.5.0 (2015-03)) describes, for example, the specification of radio resource control (RRC) of LTE-A.

NPL 9 (3GPP TS36.413 V12.5.0 (2015-03)) describes, for example, the specification of S1 of LTE-A.

NPL 10 (3GPP TS36.423 V12.5.0 (2015-03)) describes, for example, the specification of X2 of LTE-A.

NPL 11 (3GPP TR36.842 V12.0.0 (2013-12)) is, for example, a review report of a small cell technology of LTE-A.

NPL 12 (RFC793) describes, for example, the specification of TCP.

First Embodiment

Figure 1:
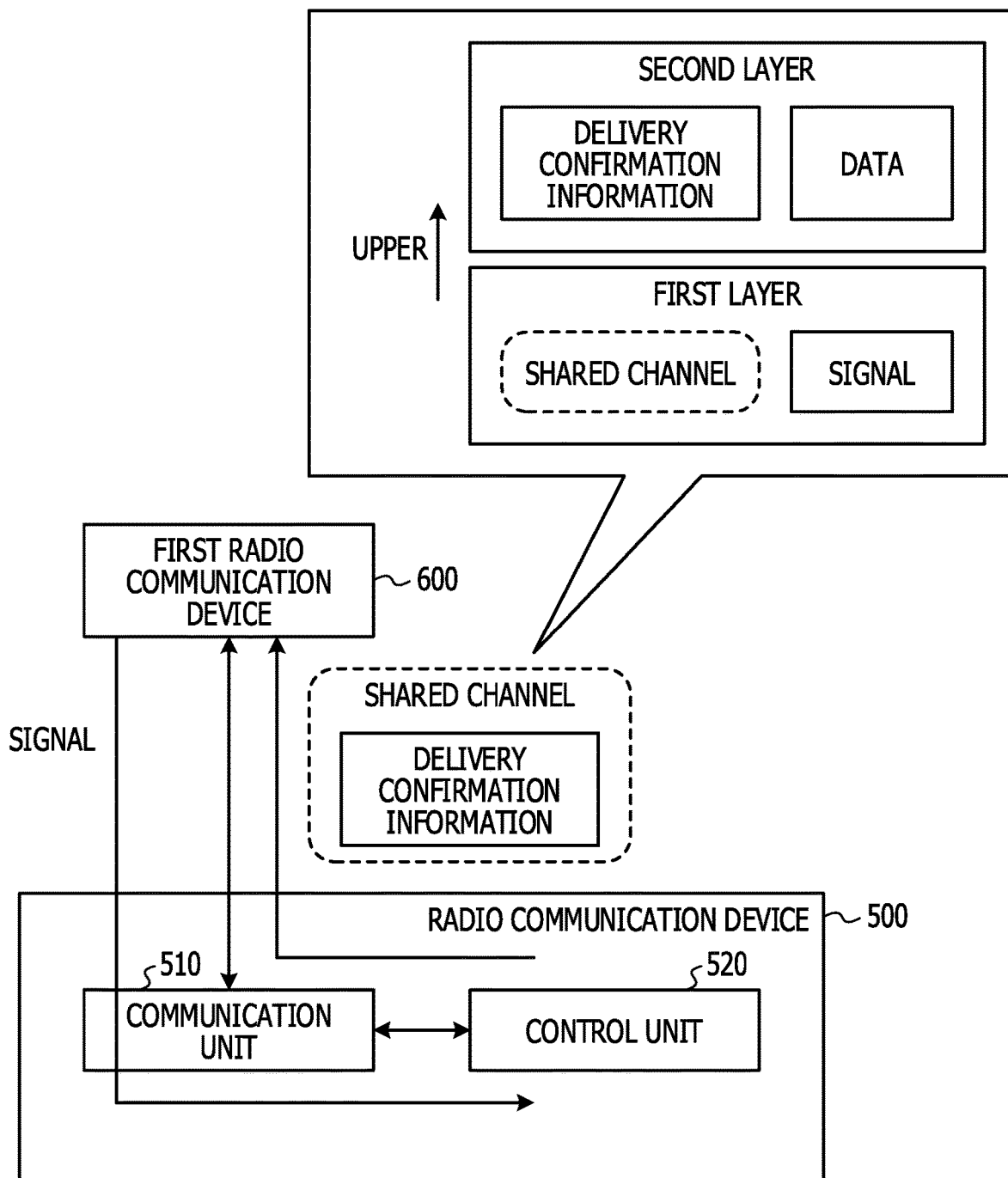
FIG. 1 is a diagram illustrating a configuration example of a radio communication system.

FIG. 1 is a diagram illustrating a configuration example of a radio communication system 10 according to the first embodiment. A radio communication system 10 includes a radio communication device 500 and a first radio communication device 600. The radio communication device 500 and the first radio communication device 600 execute radio communication. For example, the radio communication device 500 is a mobile station device and the first radio communication device is a base station device.

The radio communication device 500 includes a communication unit (may be referred to as "a first processing unit") 510 and a control unit (may be referred to as "a second processing unit") 520.

The communication unit 510 transmits and receives a signal in a first layer and data of a second layer which is an upper layer of the first layer and delivery confirmation information (may be referred to as "acknowledgement information") for the data.

The control unit 520 enables the delivery confirmation information to be transmitted from the communication unit 510 to the first radio communication device 600 using a shared channel shared between a plurality of second radio communication devices including the radio communication device 500 based on a signal received from the first radio communication device 600 without using scheduling information allocated to the first radio communication device 600.

The radio communication device 500 executes a scheduling request procedure with the first radio communication device 600 when information is transmitted using the shared channel. In the scheduling request procedure, for example, the following procedure is executed. That is, when the radio communication device 500 transmits a scheduling request to the first radio communication device 600 and the first radio communication device 600 receives the scheduling request, scheduling information for the radio communication device 500 is generated. The first radio communication device 600 transmits a UL grant including the scheduling information to the radio communication device 500, and then the radio communication device 500 transmits information using the shared channel according to the scheduling information. The transmission of the delivery confirmation information is delayed in some cases in accordance with the scheduling procedure.

In the first embodiment, the radio communication device 500 can transmit delivery confirmation information of the second layer using the shared channel based on the signal transmitted from the first radio communication device 600. Thus, the radio communication device 500 and the first radio communication device 600 do not execute the scheduling request procedure, and the radio communication device 500 can transmit the delivery confirmation information using the shared channel.

Accordingly, in the first embodiment, in the radio communication device 500, the scheduling request procedure for the transmission of the delivery confirmation information can be omitted, and thus it is possible to shorten a delay time in the transmission of the delivery confirmation information. In the first embodiment, by shortening the delay time, it is possible to achieve an improvement in throughput.

For example, as the delivery confirmation information, there is TCP ACK. Accordingly, in the first embodiment, it is possible to achieve shortening of the delay time in the transmission of the TCP ACK. In the first embodiment, by shortening the delay time, it is possible to achieve an improvement in throughput of TCP.

Second Embodiment

Next, a second embodiment will be described.

<Configuration Example of Radio Communication System>

Figure 2:
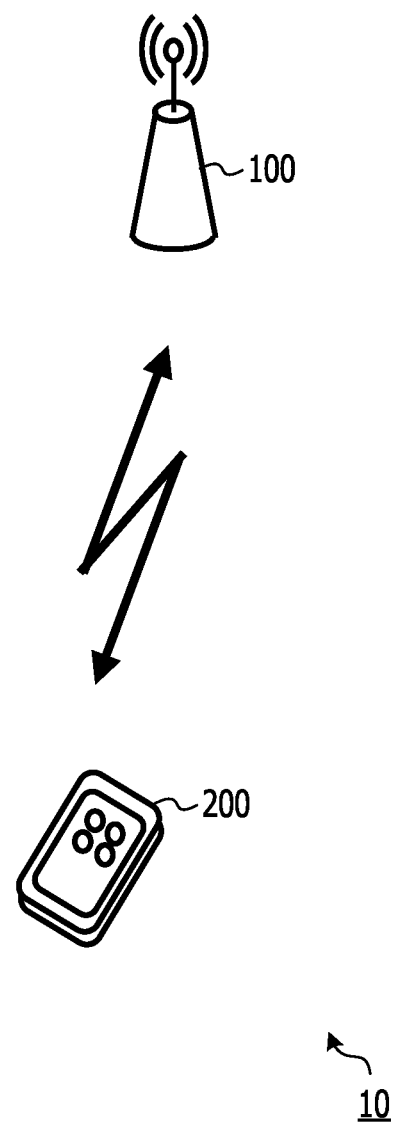
FIG. 2 is a diagram illustrating a configuration example of a radio communication system.

FIG. 2 illustrates a configuration example of the radio communication system 10. The radio communication system 10 includes a base station device (hereinafter referred to as a "base station" in some cases) 100 and a mobile station device (hereinafter referred to as a "mobile station" in some cases) 200.

The base station 100 corresponds to, for example, the first radio communication device 600 according to the first embodiment. The mobile station 200 corresponds to, for example, the radio communication device 500 according to the first embodiment.

The base station 100 is, for example, a radio communication device that executes radio communication with the mobile station 200 which resides in a service zone of the base station 100.

The mobile station 200 is, for example, a radio communication device such as a smartphone, a feature phone, a tablet terminal, a personal computer, and a game device. The mobile station 200 executes radio communication with the base station 100 and can be supplied with various services such as a calling service and a browsing service of a web page.

The base station 100 and the mobile station 200 can execute bidirectional communication. That is, communication in a direction from the base station 100 to the mobile station 200 (hereinafter referred to as a "downlink (DL) direction" or a "downward direction" in some cases) and a direction from the mobile station 200 to the base station 100 (hereinafter referred to as an "uplink (UL) direction" or an "upward direction" in some cases) is possible.

The base station 100 executes allocation of radio resources or determination of an encoding scheme and a modulation scheme by executing scheduling in radio communication with the mobile station 200 in the downward direction and the upward direction. The base station 100 transmits a control signal including scheduling information indicating a scheduling result to the mobile station 200. The base station 100 and the mobile station 200 execute radio communication according to the scheduling information included in the control signal.

In the radio communication system 10 illustrated in FIG. 2, an example in which one mobile station 200 executes radio communication with one base station 100 will be described. However, for example, a plurality of mobile stations may execute radio communication with one base station 100. One mobile station 200 may execute radio communication with a plurality of base stations. In the radio communication system 10, a plurality of base stations and a plurality of mobile stations may be included.

<Configuration Example of Base Station Device>

Figure 3:
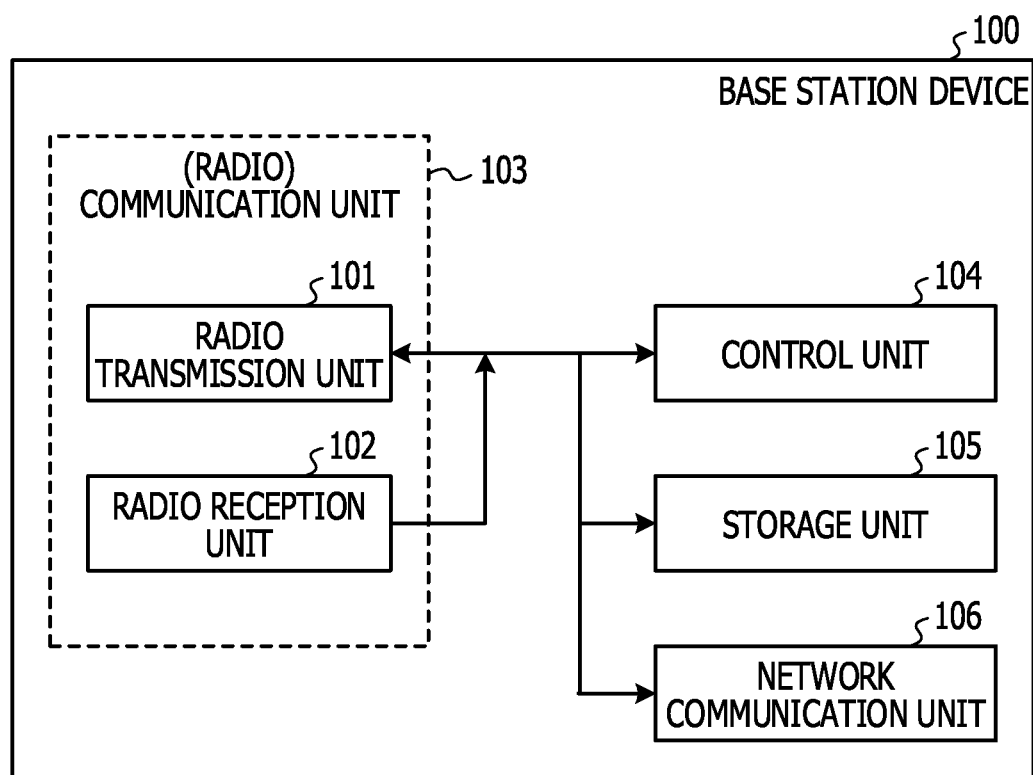
FIG. 3 is a diagram illustrating a configuration example of a base station device.

Next, a configuration example of the base station 100 will be described. FIG. 3 is a diagram illustrating a configuration example of the base station 100. The base station 100 includes a radio transmission unit 101, a radio reception unit 102, a control unit 104, a memory unit 105, and a network communication unit 106. The radio transmission unit 101 and the radio reception unit 102 may be included in a radio communication unit (or a communication unit) 103.

The radio transmission unit 101 executes, for example, an error correction encoding process (hereinafter referred to as an encoding process in some cases), a modulation process, a frequency conversion process, and the like on data read form the memory unit 105 or a control signal output from the control unit 104 to convert the data or the control signal into a radio signal. The radio transmission unit 101 receives the scheduling information including the encoding rate, the modulation scheme, or the like from the control unit 104 and executes an encoding process, a modulation process, and the like according to the scheduling information. Then, the radio transmission unit 101 transmits the converted radio signal to the mobile station 200. In this case, the radio transmission unit 101 receives the scheduling information from the control unit 104 and transmits the radio signal using radio resources included in the scheduling information. The radio resources include, for example, frequency and time resources. For example, the radio transmission unit 101 transmits data or the like using a physical downlink shared channel (PDSCH) and transmits the control signal or the like using a physical downlink control channel (PDCCH).

The radio reception unit 102 receives, for example, a radio signal transmitted from each mobile station 200 using radio resources included in the scheduling information received from the control unit 104. In this case, the radio reception unit 102 receives a radio signal including the control signal or the like using a physical uplink control channel (PUCCH) and receives a radio signal including data using a physical uplink shared channel (PUSCH). The radio reception unit 102 executes a frequency conversion process, a demodulation process, an error correction decoding process (hereinafter referred to as a "decoding process" in some cases), and the like on the received radio signal to extract the data, the control signal, and the like. The radio reception unit 102 receives the scheduling information including the modulation scheme and the encoding rate from the control unit 104 and executes the demodulation process, the decoding process, and the like according to the scheduling information. The radio reception unit 102 outputs, for example, the extracted data, control signal, and the like to the memory unit 105 or the control unit 104.

The control unit 104 executes the above-described scheduling and outputs its result as scheduling information to the radio transmission unit 101 or the radio reception unit 102. The control unit 104 generates the control signal including the scheduling information and outputs the control signal to the radio transmission unit 101. The control signal is transmitted toward the mobile station 200.

Further, the control unit 104 executes retransmission control by a hybrid automatic repeat request (HARQ). The HARQ is, for example, a technology for decoding data which fails in the decoding process on a reception side by combining the data with data retransmitted from a transmission side without discarding the data. For example, when the decoding process for the data succeeds on the reception side, the reception side transmits acknowledgement (ACK: a positive response). When the transmission side receives ACK, the transmission side starts transmitting subsequent data. Conversely, when the decoding process fails on the reception side, the reception side responds to the transmission side with negative acknowledgement (NACK) and the transmission side receives NACK and retransmits the data. ACK and NACK by HARQ are examples of the delivery confirmation information by HARQ. Retransmission control by HARQ is executed between the base station 100 and the mobile station 200.

A target of the retransmission control by HARQ is, for example, data in a medium access control (MAC) layer. A MAC packet data unit (MAC PDU) is an example of the data. The MAC layer is included in the data link layer (Layer 2) of the OSI reference model.

The control unit 104 executes, for example, retransmission control by HARQ as follows. That is, the radio reception unit 102 notifies the control unit 104 of a processing result indicating whether data can correctly be decoded when the decoding process is executed based on a cyclic redundancy check (CRC) or the like added to the data of the MAC layer. The control unit 104 generates ACK or NACK according to the processing result. The control unit 104 transmits ACK by HARQ (hereinafter referred to as "HARQ ACK" in some cases) or NACK by HARQ (hereinafter referred to as "HARQ NACK" in some cases) to the mobile station 200 via the radio transmission unit 101. On the other hand, when HARQ ACK is received from the base station 200 via the radio reception unit 102, the control unit 104 starts transmitting subsequent data. When HARQ NACK is received from the mobile station 200 via the radio reception unit 102 or when HARQ ACK is not received although a given time has passed after transmission of the data of the MAC layer, the control unit 104 reads the data for which HARQ ACK is not confirmed from the memory unit 105 and retransmits the data to the mobile station 200.

The memory unit 105 stores, for example, the data, the control signal, and the like. For example, the radio reception unit 102, the control unit 104, and the network communication unit 106 appropriately store the data, the control signal, and the like in the memory unit 105. The radio transmission unit 101, the control unit 104, and the network communication unit 106 appropriately read the data, the control signal, and the like stored in the memory unit 105.

The network communication unit 106 is connected to another device and transmits and receives data or the like to and from the other device. At this time, the network communication unit 106 converts the data into packet data with a format which can be output to the other device and transmits the packet data to the other device, or extracts data or the like from packet data received from the other device and outputs the data or the like to the memory unit 105, the control unit 104, or the like. Examples of the other device include another base station device, a mobility management entity (MME), or a serving gateway (SGW).

<Configuration Example of Mobile Station Device>

Figure 4:
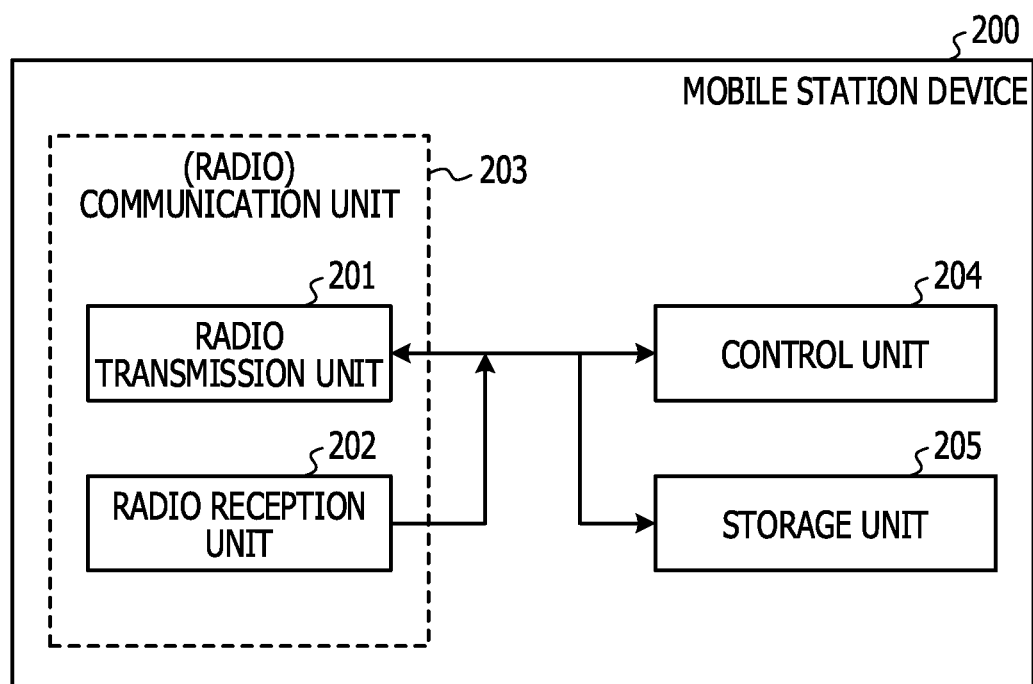
FIG. 4 is a diagram illustrating a configuration example of a mobile station device.

FIG. 4 is a diagram illustrating a configuration example of the mobile station 200. The mobile station 200 includes a radio transmission unit 201, a radio reception unit 202, a control unit (may be referred to as "a second processing unit") 204, and a memory unit 205. The radio transmission unit 201 and the radio reception unit 202 may be included in a radio communication unit (or a communication unit (i.e. a first processing unit)) 203.

The communication unit 203 corresponds to, for example, the communication unit 510 according to the first embodiment. The control unit 204 corresponds to, for example, the control unit 204 according to the first embodiment.

For example, the radio transmission unit 201 executes an encoding process, a modulation process, a frequency conversion process, and the like on the data read from the memory unit 205 or the control signal or the like output from the control unit 204 to convert the data, or the control, or the like into a radio signal. The radio transmission unit 201 receives scheduling information including the encoding rate or the modulation scheme from the control unit 204 and executes the encoding process or the modulation process according to the scheduling information. The radio transmission unit 201 transmits the radio signal to the base station 100. In this case, the radio transmission unit 201 receives the scheduling information including the radio resources allocated to the mobile station 200 from the control unit 204 and transmits the radio signal to the base station 100 using the radio resources. For example, the radio transmission unit 201 transmits the control signal or the like using the PUCCH and transmits data or the like using the PUSCH.

The radio reception unit 202 receives the radio signal transmitted from the base station 100. At this time, the radio reception unit 202 receives the scheduling information including the radio resources allocated to the mobile station 200 from the control unit 204 and receives the radio signal using the radio resources. For example, the radio reception unit 202 receives the radio signal including the control signal or the like using the PDCCH and receives the radio signal including the data or the like using the PDSCH. The radio reception unit 202 executes the frequency conversion process, the demodulation process, the decoding process, and the like on the received radio signal to extract the data, the control signal, and the like from the radio signal. At this time, the radio reception unit 202 receives the scheduling information such as the modulation scheme or the encoding rate from the control unit 204 and executes the demodulation process or the decoding process according to the modulation scheme, the encoding rate, and the like. For example, the radio reception unit 202 outputs the extracted data, control signal, and the like to the control unit 204 or the memory unit 205.

The control unit 204 receives the control signal from the radio reception unit 202, extracts the scheduling information or the like allocated to the mobile station 200 from the control signal, and outputs the scheduling information or the like to the radio transmission unit 201 or the radio reception unit 202.

The control unit 204 generates a control signal or the like and outputs the control signal or the like to the radio transmission unit 201. The control signal may include, for example, HARQ ACK or HARQ NACK, channel state information (CSI), and a scheduling request (SR).

Further, the control unit 204 executes delivery confirmation (or response confirmation) and a retransmission process for TCP data. For example, the TCP data is exchanged between the mobile station 200 and a server that handles TCP via the base station 100. In this case, in principle, the base station 100 transmits a TCP packet transmitted from the server to the mobile station 200 or transmits a TCP packet transmitted from the mobile station 200 to the server without analyzing a TCP header or TCP data included in the TCP packet.

Even in retransmission of TCP, when a TCP reception side can correctly receive TCP data transmitted from a TCP transmission side, the TCP reception side responds to the TCP transmission side with TCP ACK (or a positive response). When the TCP ACK is received, the TCP transmission side starts transmitting subsequent TCP data. Conversely, when the TCP ACK is not received although a given time has passed after the transmission of the TCP data, the TCP transmission side retransmits the TCP data for which the TCP ACK is not confirmed to the reception side. In this case, for example, the TCP transmission side may determine that the TCP data may not correctly be received by the TCP reception side when receiving a plurality (for example, 3) of TCP ACKs (or repeated ACK) with the same confirmation response number, and may retransmit the TCP data. The retransmission process by TCP is executed by, for example, the control unit 204. In this case, the control unit 204 confirms whether the TCP data can correctly be received, generates delivery confirmation information of TCP according to a result, and transmits the delivery confirmation information to the server via the radio transmission unit 101.

When the TCP ACK may not b received although a given time has passed after transmission of the TCP data to the server or the like via the radio transmission unit 101, the control unit 204 reads the TCP data for which the TCP ACK stored in the memory unit 205 may not be confirmed and transmits the TCP data to the server via the radio transmission unit 101.

TCP is included in the transport layer (Layer 4) of the OSI reference model. On the other hand, the MAC layer in which HARQ ACK or the like is handled is included in the data link layer (Layer 2) of the OSI reference model. The transport layer is an upper layer of the data link layer.

A radio link control (RLC) layer and a packet data convergence protocol (PDCP) layer in LTE or the like are included in the data link layer and are sublayers of the data link layer. For the MAC layer, an RCL layer, and the PDCP layer, the MAC layer is a lower layer and the PDCP layer is an upper layer in these layers.

For example, the control unit 204 can receive data of the MAC layer from the radio reception unit 202, can generate or extract data of each layer from data of the MAC layer to TCP data, and subsequently can execute a process on the TCP data. For example, the control unit 204 can transmit the data of the MAC layer to the base station 100 by generating or extracting the data of each layer from the TCP data to the data of the MAC layer and subsequently outputting the data of the MAC layer to the radio transmission unit 201.

Further, the control unit 204 executes retransmission control by HARQ. The retransmission control by HARQ is executed between the base station 100 and the mobile station 200. For example, the control unit 204 and the like execute the following process. That is, the radio reception unit 202 notifies the control unit 204 of a processing result indicating whether data can correctly be decoded when the decoding process is executed based on a CRC or the like added to the data of the MAC layer. The control unit 204 generates HARQ ACK or HARQ NACK according to the processing result. The control unit 204 transmits HAR ACK or HARQ NACK to the base station 100 via the radio transmission unit 201. On the other hand, when HARQ ACK is received from the base station 100 via the radio reception unit 202, the control unit 204 starts transmitting subsequent data of the MAC layer. When HARQ NACK is received from the base station 100 or HARQ ACK is not received although a given time has passed after the transmission of the data of the MAC layer, the control unit 204 reads the data for which HARQ ACK is not confirmed from the memory unit 205 and retransmits the data to the base station 100.

The memory unit 205 stores, for example, the data, the control signal, and the like. For example, the radio reception unit 202 or the control unit 204 appropriately stores the data, the control signal, and the like in the memory unit 205. The radio transmission unit 201 or the control unit 204 appropriately reads the data, the control signal, and the like stored in the memory unit 205.

In the base station 100 or the mobile station 200, for example, information processed before modulation or after decoding is referred to as data or control information in some cases, and information processed after modulation or before decoding is referred to as a signal in some cases. Alternatively, for example, information handled in the transport layer is also referred to as data, control information, or the like in some cases and information handled in the MAC layer is referred to as a signal in some cases.

<Example of Operation>

Next, an example of an operation will be described. First, a transmission example of TCP ACK in the mobile station 200 will be described. Next, an example of an operation in the second embodiment will be described.

<Transmission Example of TCP ACK by Mobile Station>

Figure 5A:
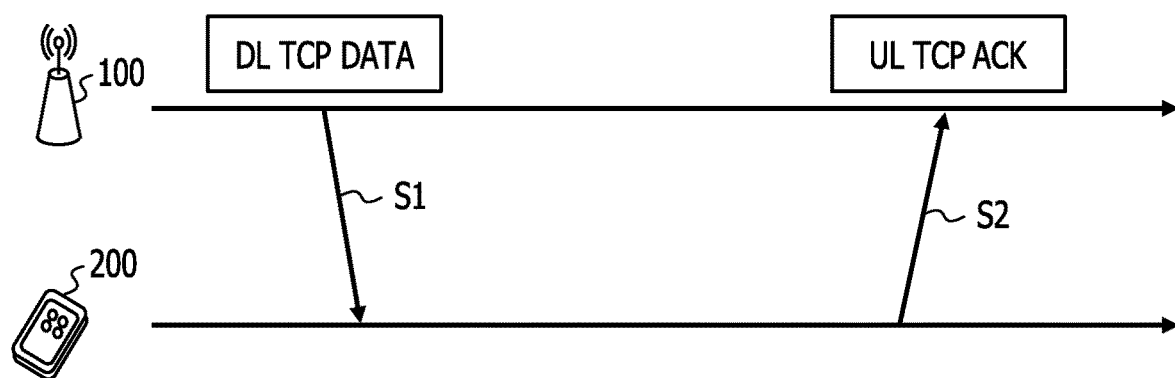
FIGS. 5A and 5B are diagrams illustrating transmission examples of TCP ACK.

FIGS. 5A to 6 are diagrams illustrating a transmission example of TCP ACK. As illustrated in FIG. 5A, when the mobile station 200 normally receives TCP data transmitted in the downward direction ("DL TCP data") (S1), the mobile station 200 generates TCP ACK. The mobile station 200 transmits the generated TCP ACK ("UL TCP ACK") in the upward direction (S2). As described above, the TCP data is generated by, for example, a server or the like connected to the base station 100 and is transmitted to the mobile station 200 via the base station 100. TCP ACK is also transmitted toward the server generating the TCP data via the base station 100.

Figure 5B:
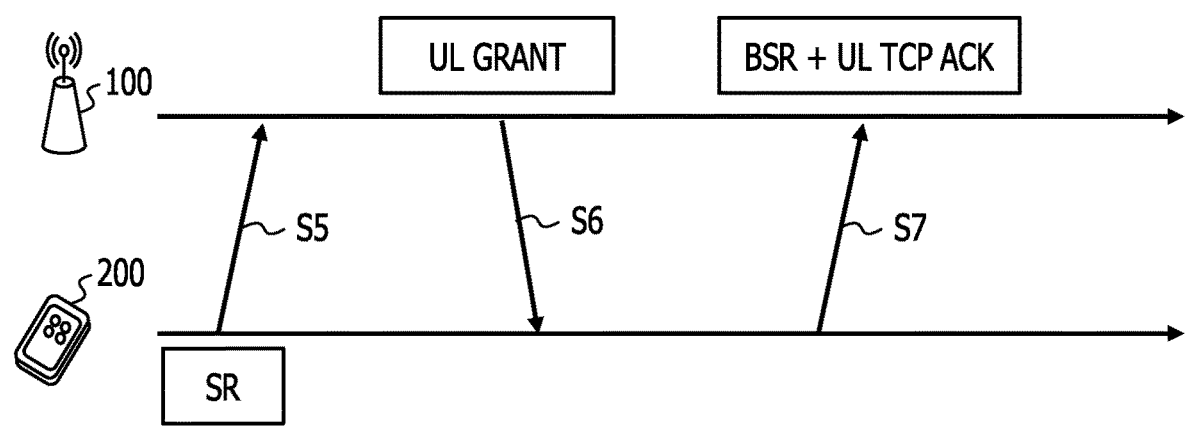

In this case, the mobile station 200 executes, for example, a scheduling request procedure illustrated in FIG. 5B to transmit TCP ACK.

That is, the mobile station 200 transmits the scheduling request (SR) to the base station 100 using the PUCCH (S5). The base station 100 receives the scheduling request and generates the scheduling information. The base station 100 transmits a UL grant (or transmission permission) including the scheduling information to the mobile station 200 using the PDCCH (S6). The mobile station 200 transmits TCP ACK to the mobile station 200 using the radio resources of the PUSCH allocated with the scheduling information (S7). The example of FIG. 5B is an example in which the mobile station 200 transmits TCP ACK and a buffer status report (BSR) to the base station 100.

Figures 6A, 6B:
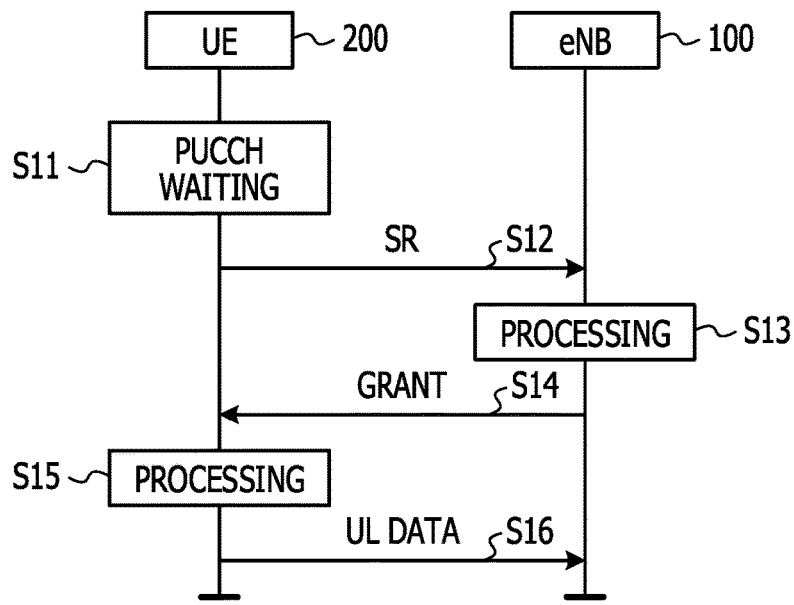
FIG. 6A is a diagram illustrating a sequence example of an SR procedure and FIG. 6B is a diagram illustrating a detailed example of a delay time.

FIG. 6A illustrates a sequence example of a series of processes until the mobile station 200 can transmit data in the upward direction and FIG. 6B illustrates an example of a time taken for the mobile station 200 to transmit data in the upward direction.

For example, when data occurs, the mobile station (user equipment (UE)) 200 waits for an opportunity to transmit the PUCCH (S11) and transmits the scheduling request using the PUCCH (S12). The base station (evolved Node B (eNB)) 100 executes a process of allocating radio resources or the like (S13) and transmits a UL grant (S14). The mobile station 200 receives the UL grant, executes a process on the data, such as an encoding process (S15), and transmits the data ("UL data") using the radio resources included in the PUSCH (S16). An example of the UL data includes TCP ACK.

FIG. 6B illustrates an example of an elapsed time in each process of S11 to S16 in the sequence of the series of the processes. For example, an average delay time in the process of S11 is "2.5 ms" or the like. As illustrated in FIG. 6B, a delay time until one mobile station 200 transmits the data in the upward direction is assumed to be about "11.5 ms" despite being error-free. That is, a delay time taken to transmit TCP ACK is assumed to be about "11.5 ms". The delay time has a considerable influence on TCP communication and is one factor which deteriorates throughput in TCP. As a simply reference example, for example, a round-trip time (RTT) on an Internet circuit from Tokyo to Osaka was about 20 ms. The magnitude of "11.5 ms" can also be understood from the reference value.

Figure 7:
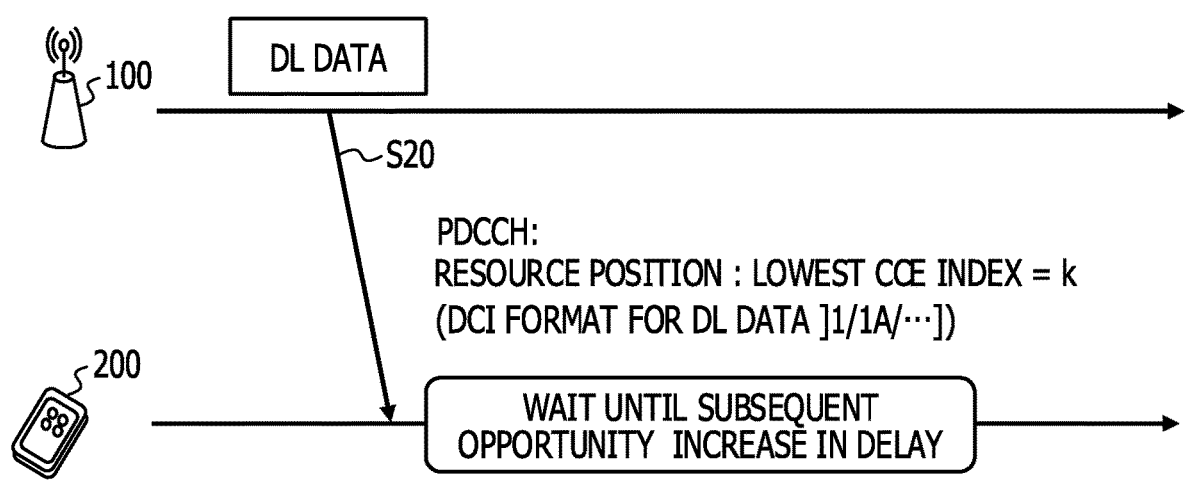
FIG. 7 is a diagram illustrating an example of transmission delay of the TCP ACK.

For example, the mobile station 200 can also transmit TCP ACK using the PUCCH. However, the mobile station 200 may not transmit TCP ACK at a timing at which TCP ACK is desired to be transmitted in some cases, for example, when the PUCCH is not set in a subframe with which TCP ACK is desired to be transmitted or radio resources of the PUCCH used to transmit other signals lack. In this case, as illustrated in FIG. 7, the mobile station 200 waits for transmission of TCP ACK until a subsequent opportunity (for example, after 5 ms) of the PUCCH, and thus transmission delay of TCP ACK increases.

Accordingly, in the second embodiment, the mobile station 200 transmits TCP ACK using the PUSCH without executing the scheduling request procedure. Thus, the scheduling request procedure illustrated in FIG. 5B or 6A is omitted, and thus it is possible to short the delay time taken to transmit TCP ACK. By shorting the delay time of TCP ACK, it is also possible to improve throughput in TCP.

In the second embodiment, when TCP ACK is transmitted using the PUSCH, the mobile station 200 does not execute the scheduling request procedure. Therefore, no UL grant is given from the base station 100. Therefore, the mobile station 200 transmits TCP ACK using the PUSCH based on a signal transmitted from the base station 100 without receiving the UL grant (or without using scheduling information). Specifically, there are eight methods as follows. Hereinafter, the methods will be described in sequence.

(1) Determination of a PUSCH physical resource block (PRB) index based on a PDCCH lowest control channel element (CCE) index=k (2) Determination of a modulation and coding scheme (MCS) index from relation between PDCCH aggregation level and a PUSCH MCS index (3) Value of cyclic shift of PUSCH demodulation reference signal (DMRS) as a fixed value (4) Presetting of transmission timing of the PUSCH of TCP ACK by radio resource control (RRC)

(5) Improvement in (1)

(6) Improvement in (4)

Figure 8:
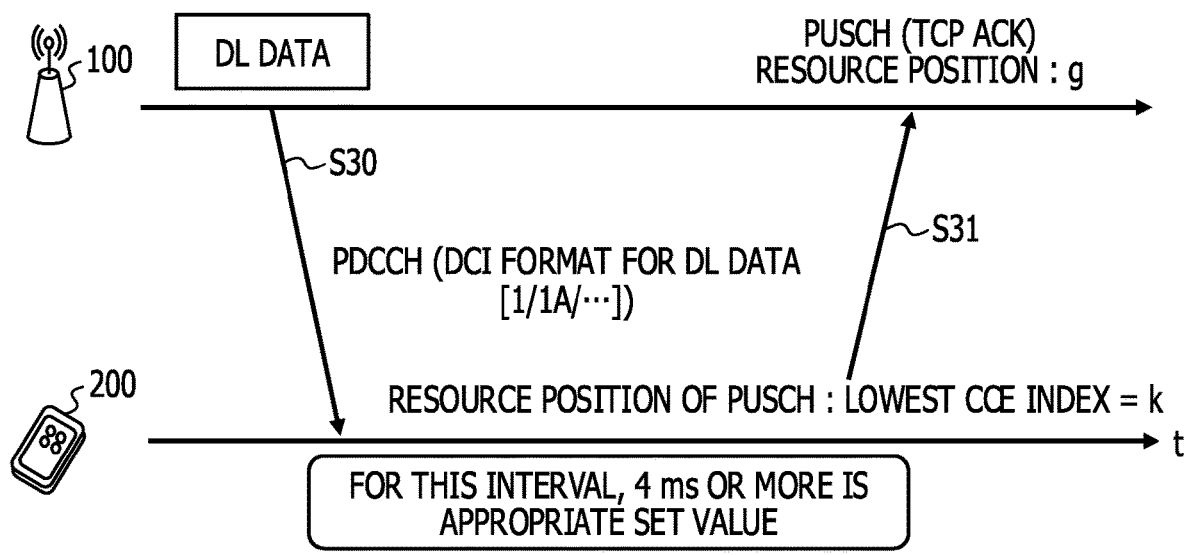
FIG. 8 is a diagram illustrating a transmission example of the TCP ACK.

(7) execution of semi-persistent scheduling (SPS) for transmitting TCP ACK (8) Others (1) Determination of a PUSCH PRB Index Based on a PDCCH Lowest CCE Index=k FIG. 8 is a diagram illustrating a transmission example of TCP ACK when the PUSCH PRB index is determined based on the PDCCH lowest CCE index=k. When the PDCCH is received (S30), the mobile station 200 determines (or selects) a position g of the radio resource of the PUSCH with which TCP ACK is transmitted, based on the first CCE index (lowest CCE index) of the CCEs included in the PDCCH. The mobile station 200 transmits TCP ACK using the radio resource of the determined position g. The base station 100 receives TCP ACK using the radio resource.

The CCE is, for example, a unit (or component) of a radio resource used to transmit the PDCCH. The base station 100 allocates, for example, 1, 2, 4, or 8 continuous CCEs for each mobile station 200. The base station 100 transmits a control signal or the like destined for the mobile station 200 using the allocated CCEs. The number of CCEs is equivalent to an aggregation level. For example, when the number of CCEs is 8, the aggregation level is 8. The base station 100 can determine the number of CCEs so that the encoding rate decreases as the number of CCEs included in one PDCCH increases. The base station 100 may determine the number of CCEs allocated to one base station 200 based on radio quality.

Figure 9:
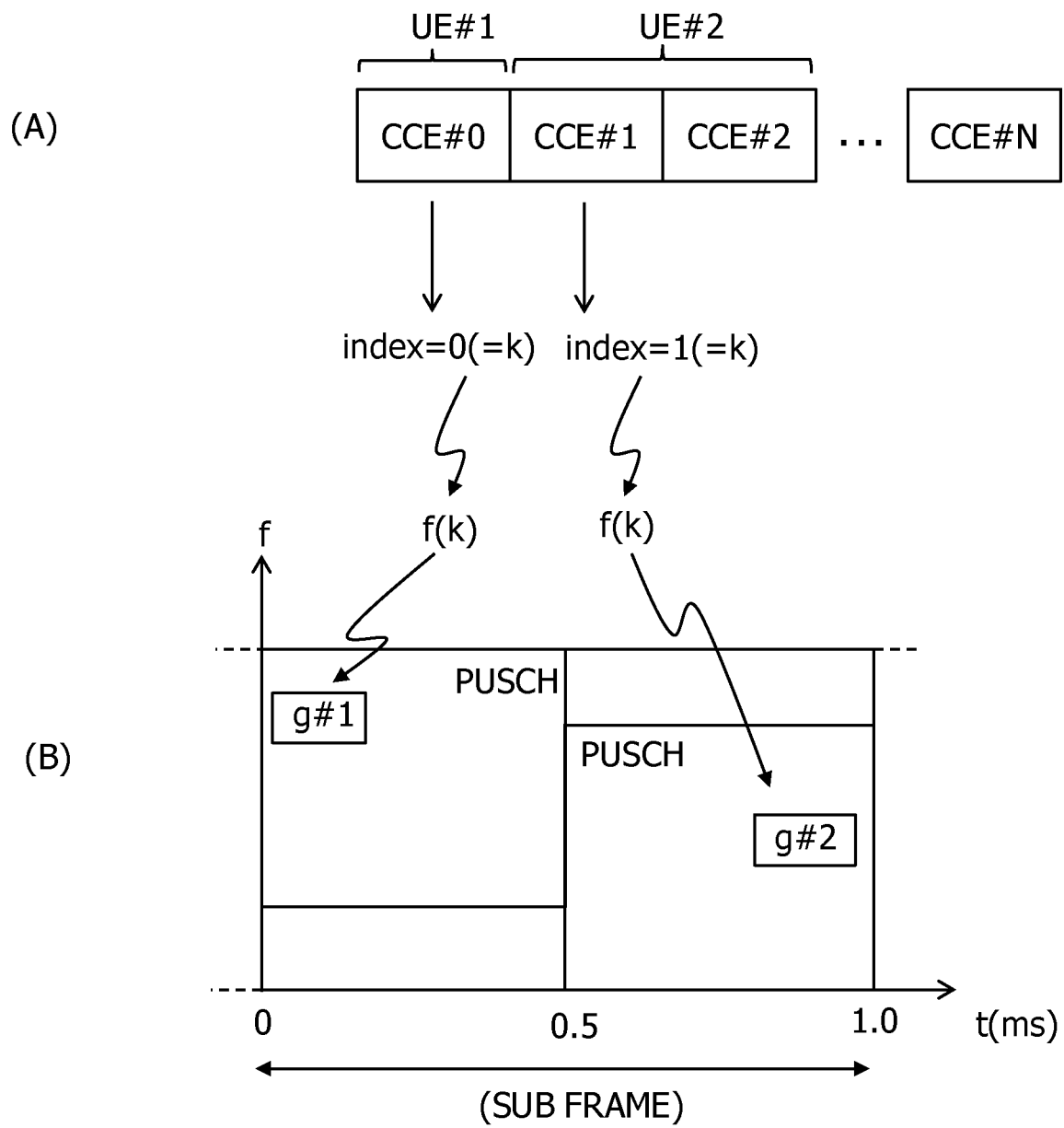
FIG. 9 includes a section (A) which is a diagram illustrating an allocation example of CCE to the mobile station device, and a section (B) which is a diagram illustrating an allocation example of the TCP ACK to a PUSCH.

FIG. 9(A), which is a section (A) of FIG. 9, illustrates an example of the CCEs allocated to each mobile station 200 by the base station 100. In the example of FIG. 9(A), the base station 100 allocates CCE (CCE #0) with a CCE index of "0" (or an index: hereinafter referred to as a "CCE index" in some cases) to a mobile station 200-1 (UE #1). The base station 100 allocates to two CCEs (CCE #1 and CCE #2) with CCE indexes of "1" and "2" to the mobile station 200-2 (UE #2). For example, the base station 100 allocates the CCE indexes to a plurality of users (or the mobile stations 200) multiplexed in the same subframe so that the same CCE index is repeated. The mobile station 200 executes, for example, a decoding process or the like on all CCEs (or CCEs within a given candidate range) to detect CCEs which can correctly be decoded as CCEs which can be allocated to the mobile station. In this case, the mobile station 200 can also specify the CCE indexes according to the number of CCEs which can correctly be decoded. For example, when the number of CCEs which can correctly be decoded is 1, the CCE is CCE #0. When the number of CCEs which can correctly be decoded is 2, the CCEs are CCE #1 and CCE #2). This detection is referred to as, for example, blind detection (or blind decoding) in some cases.

The mobile station 200 determines the resource position g of the PUSCH used to transmit TCP ACK using the first CCE index k among the CCE indexes detected through the blind detection in this way. For example, as illustrated in FIG. 9B (i.e. a section (B) of FIG. 9), when the first CCE index k for the mobile station 200-1 is "0", the position g #1 in the PUSCH is determined as a radio resource used to transmit TCP ACK by f(0). When the first CCE index k for the mobile station 200-2 is "1", g #2 in the PUSCH is determined as a radio resource used to transmit TCP ACK by f(1). The function f may be determined as a system or may be determined for each of the mobile stations 200-1 and 200-2.

Referring back to FIG. 8, the mobile station 200 transmits TCP ACK using the position g of the radio resource of the PUSCH determined by f(k) (S31).

Figure 10:
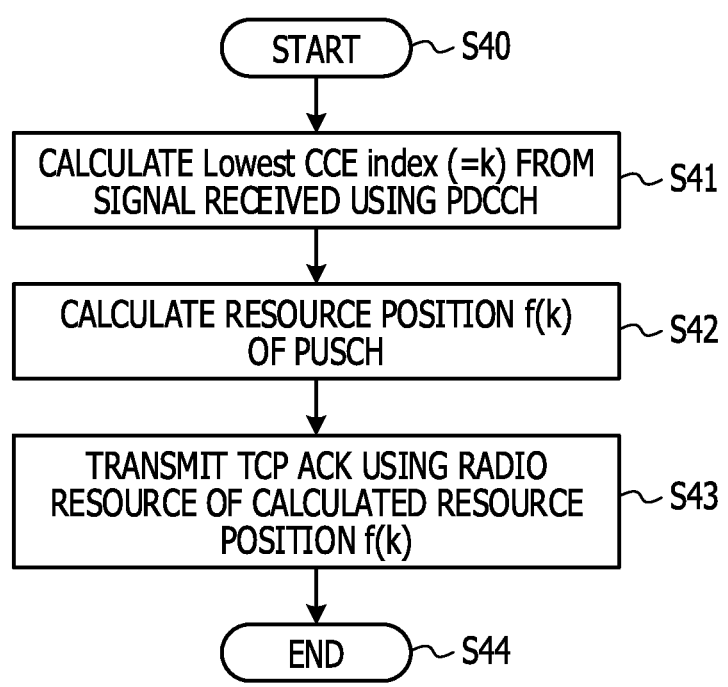
FIG. 10 is a flowchart illustrating an operation example.

FIG. 10 is a flowchart illustrating an example of an operation in the mobile station 200. In FIG. 10, the example of the operation described above is collected.

When the mobile station 200 starts a process (S40), the mobile station 200 detects the first CCE index k among the CCE indexes allocated to the mobile stations 200 from the signal received using the PDCCH (S41). For example, the radio reception unit 202 detects the first CCE index k through the blind detection on the signal received using the PDCCH and outputs the detected CCE index k to the control unit 204.

Subsequently, the mobile station 200 calculates the resource position g=f(k) in the PUSCH based on the detected first CCE index k (S42). For example, the control unit 204 calculates the resource position g by reading an expression indicating the function f stored in the memory unit 205 and substituting the first CCE index k to the function f received from the radio reception unit 202.

Subsequently, the mobile station 200 transmits TCP ACK using the radio resource of the calculated resource position g of the PUSCH (S43). For example, the following process is performed. That is, the control unit 204 outputs the resource position f(k) to the radio transmission unit 201. The control unit 204 generates TCP ACK and outputs the data of the MAC layer corresponding to the generated TCP ACK to the radio transmission unit 201. The radio transmission unit 201 executes the encoding process, the modulation process, and the like on the data to convert the data into the radio signal and transmits the radio signal to the base station 100 using the radio resource at the resource position g of the PUSCH. Thus, TCP ACK is transmitted to the base station 100 using the PUSCCH.

(2) Determination of an MCS from Correspondent Relation Between PDCCH Aggregation Level and a PUSCH MCS Index.

Figure 11A:
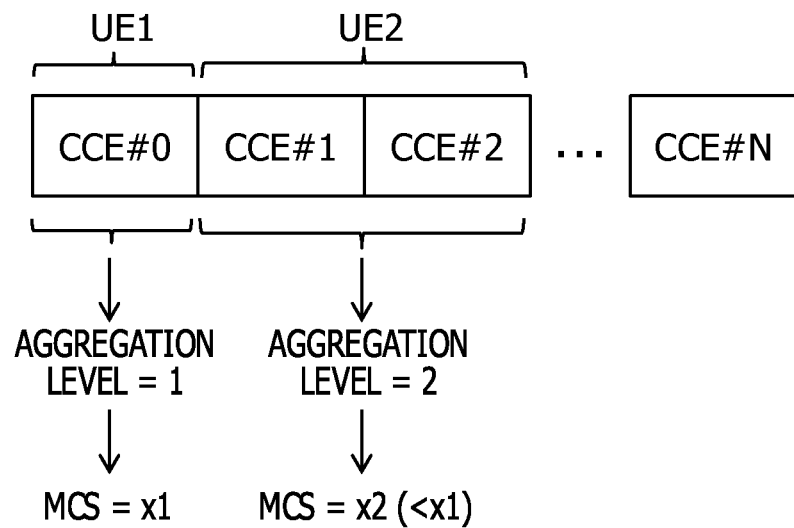
FIG. 11A is a diagram illustrating a relation example between an aggregation level and MCS and FIG. 11B is a diagram illustrating each example of cyclic shift of DMRS.
Figure 11B:
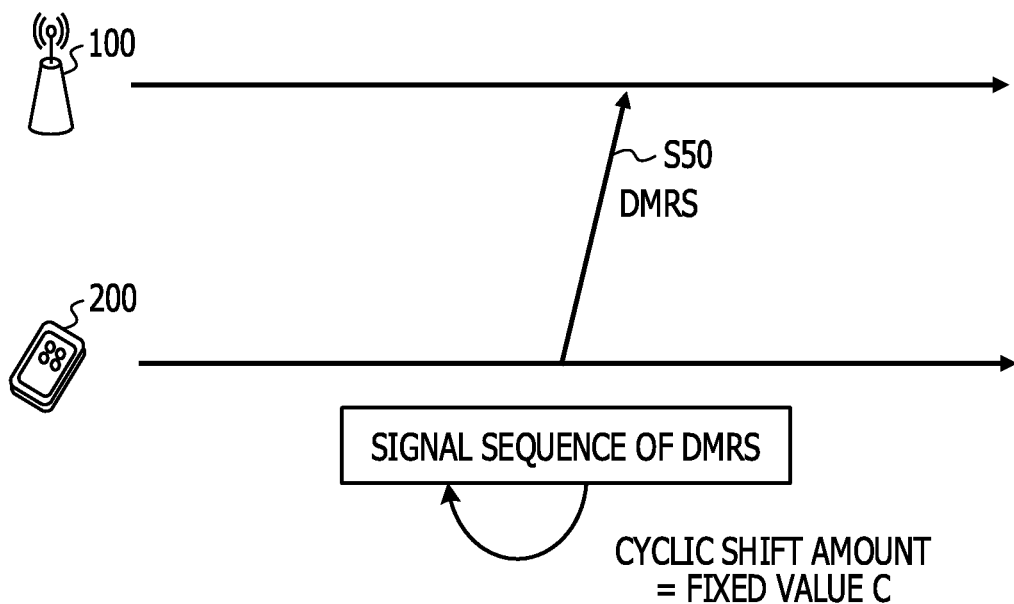

FIG. 11A illustrates an example of a correspondent relation between a PDCCH aggregation level (or an aggregation level: hereinafter referred to as an "aggregation level" in some cases) and the PUSCH MCS index. For example, the correspondent relation between the aggregation level and the PUCH MCS index is determined in advance. Then, the mobile station 200 determines MCS based on the aggregation level using the correspondent relation. MCS (or an MCS level value) indicates, for example, a combination of the encoding rate and the modulation scheme.

In the correspondent relation, for example, the PUSCH MCS level value is smaller as the aggregation level value is larger. The PUSCH MCS level value is larger as the aggregation level value is smaller. In other words, when the aggregation level value is greater than a first threshold, the MCS level value is less than a second threshold. Conversely, when the aggregation level value is equal to or less than the first threshold, the MCS level value is equal to or greater than the second threshold.

Alternatively, when the aggregation level value increases over time, the PUSCH MCS level value decreases. When the aggregation level value decreases, the PUSCH MCS level value increases.

In the example of FIG. 11A, the aggregation level value is "1" and the PUSCH MCS level value is "x1" in mobile station UE #1. In mobile station UE #2, the aggregation level value is "2" and the PUSCH MCS level value is "x2" (<x1) in mobile station UE #2.

As illustrated in FIG. 11A, the aggregation level (or the aggregation level value) corresponds to, for example, the number of CCEs allocated to the mobile station 200. In the example of FIG. 11A, since the number of CCEs allocated to UE #1 is "1", the aggregation level is "1" in UE #1. Since the number of CCEs allocated to UE #2 is "2", the aggregation level is "2" in UE #2.

For example, the mobile station 200 may execute the following process. That is, based on the determined correspondent relation, the PUSCH MCS level value corresponding to the aggregation level value is stored in the memory unit 205. Alternatively, the memory unit 205 may store the correspondent relation. Then, the control unit 204 of the mobile station 200 reads the PUSCH MCS level value corresponding to the aggregation level value detected in the blind decoding from the memory unit 205. The control unit 204 outputs the read PUSCH MCS level value to the radio transmission unit 201 and the radio transmission unit 201 executes the encoding process, the modulation process, and the like on TCP ACK based on the PUSCH MCS level value and transmits TCP ACK to the base station 100.

(3) Value of Cyclic Shift of PUSCH DMRS as a Fixed Value

For example, the mobile station 200 uses a cyclic shift sequence obtained by executing cyclic shift on a Zadoff-Chu (ZC) sequence based on a value of the cyclic shift included in the UL grant for a data decoding reference signal (DMRS). In the second embodiment, since the UL grant is not used, a fixed value C determined in advance is used as the value of the cyclic shift in the mobile station 200. Thus, for example, the base station 100 can easily detect a data decoding reference signal and can easily also decode the data transmitted from the mobile station 200 using the detected data decoding reference signal. For example, the control unit 204 reads the fixed value C stored in the memory unit 205, generates a sequence such as the ZC sequence, and the sequence obtained through the cyclic shift based on the fixed value C is used as the data decoding reference signal.

(4) Presetting of Transmission Timing of the PUSCH of TCP ACK by RRC

Figure 12:
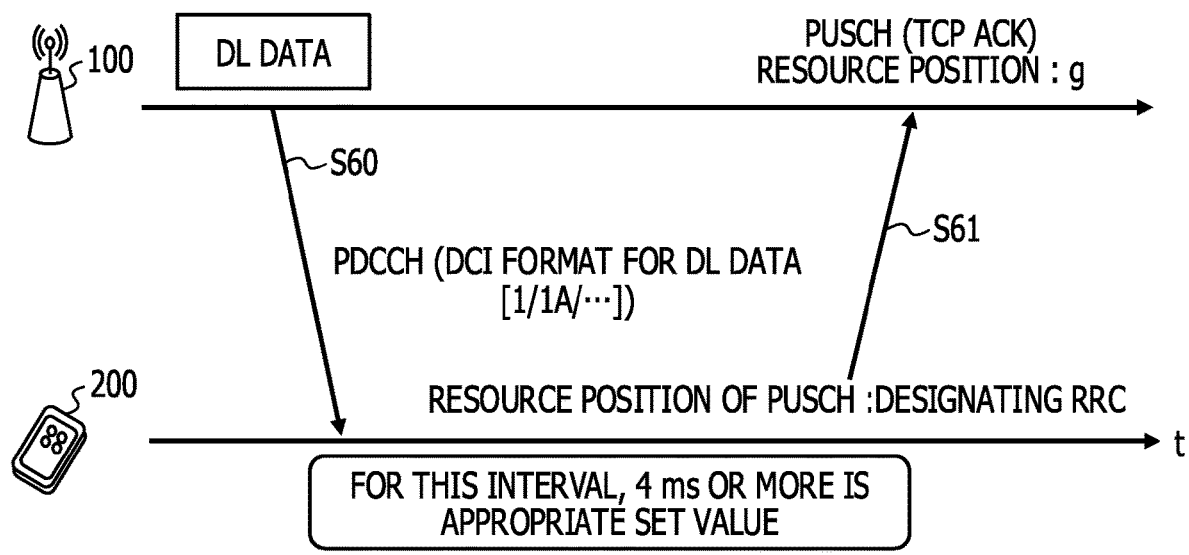
FIG. 12 is a diagram illustrating a transmission example of the TCP ACK.

FIG. 12 is a diagram illustrating a transmission example of TCP ACK when a transmission timing of TCP ACK is set by RRC. The base station 100 and the mobile station 200 transmit and receive a signal in a determined procedure in some cases, for example, when the mobile station 200 waits or a new radio connection is established. The procedure may be, for example, a procedure defined in the specification including the above-described non-patent literature. An example of the procedure includes an RRC procedure.

In the second embodiment, the base station 100 notifies the mobile station 200 of the transmission timing of TCP ACK in the PUSCH using a signal transmitted and received in the procedure, and then the mobile station 200 transmits TCP ACK at a predetermined timing based on the signal.

For example, the base station 100 and the mobile station 200 execute the following process. That is, the control unit 104 of the base station 100 determines a transmission timing at which TCP ACK is transmitted and instructs the radio transmission unit 101 to generate a signal including information regarding the determined timing. The radio transmission unit 101 generates the signal according to the instruction and transmits the signal according to the determined procedure. The radio reception unit 202 of the mobile station 200 receives the signal, extracts information regarding the transmission timing from the received signal, and outputs the information to the control unit 204. The control unit 204 outputs the extracted information regarding the transmission timing to the radio transmission unit 201 and transmits TCP ACK to the radio transmission unit 201 according to the timing (S61).

For example, the information notified of with the signal of the determined procedure may be a frequency used to transmit TCP ACK in addition to the transmission timing or a part or all of the information regarding the radio resources may be notified of.

(5) Improvement in (1)

In (1) described above, the position of the radio resource used to transmit TCP ACK in the PUSCH has been determined based on the PDCCH lowest CCE index=k. This example is an example in which (1) described above is improved and the position of a radio resource (PRB) of the PUSCH used to transmit TCP ACK is set based on a signal transmitted and received in the procedure determined in advance. The procedure may be a procedure defined in the specification including the above-described non-patent literature, like (4) described above. An example of the procedure includes an RRC procedure.

The position of the PRB notified of in the procedure may be a start position or an end position of the PRB transmitted with TCP ACK or the position of the PRB in the PUSCH used to transmit TCP ACK may be indicated. In this example, content described in (4) described above, FIG. 12, and the like are quoted. In this case, when the signal by the determined procedure is received, the control unit 204 instructs the radio transmission unit 201 to transmit TCP ACK using the radio resource located at a predetermined position of the PUSCH based on the signal. The radio transmission unit 201 transmits TCP ACK using the radio resource according to the instruction.

(6) Improvement in (4)

In (4) described above, the example in which the transmission timing of TCP ACK is set in advance with the signal transmitted and received in the procedure determined in advance using the PUSCH has been described. This example is an example in which the base station 100 estimates a timing at which TCP ACK occurs in the mobile station 200 and sets a transmission timing of the PDCCH, and the mobile station 200 transmits TCP ACK using the PUSCH based on the timing.

Figure 13:
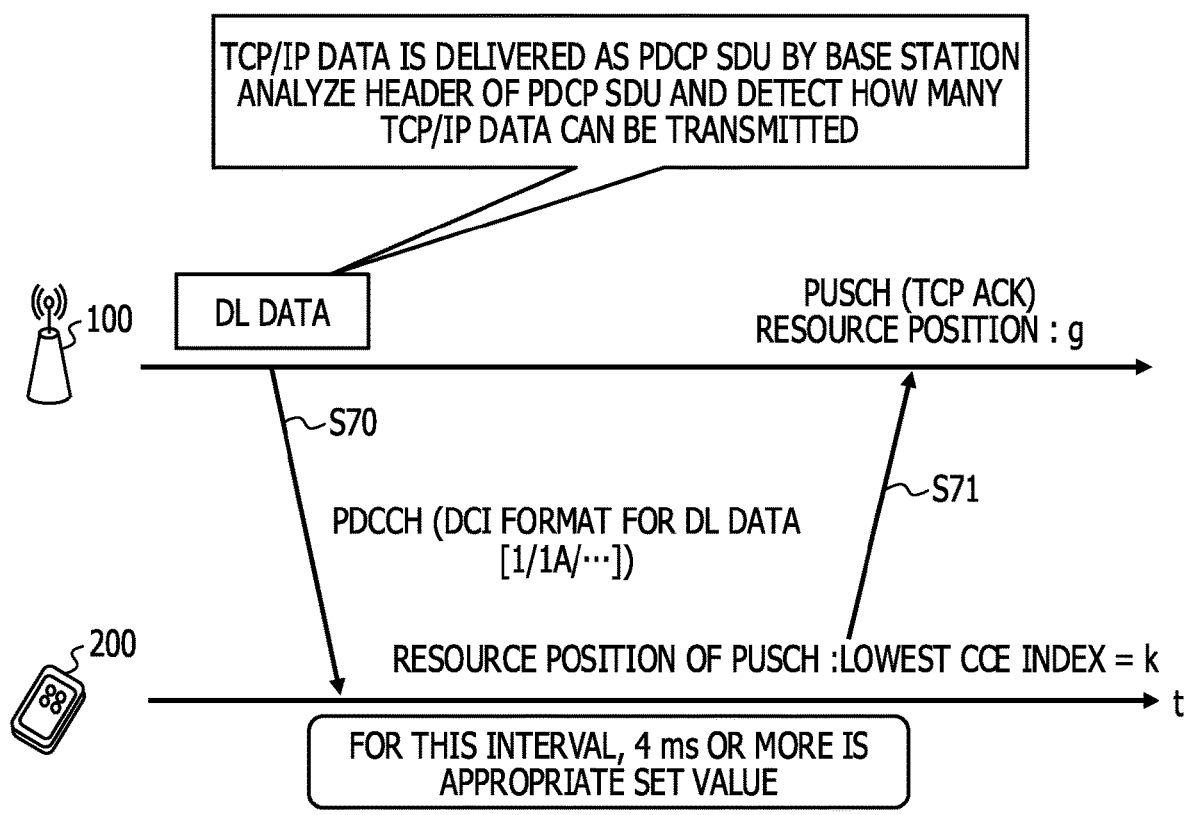
FIG. 13 is a diagram illustrating a transmission example of the TCP ACK.
Figure 14:
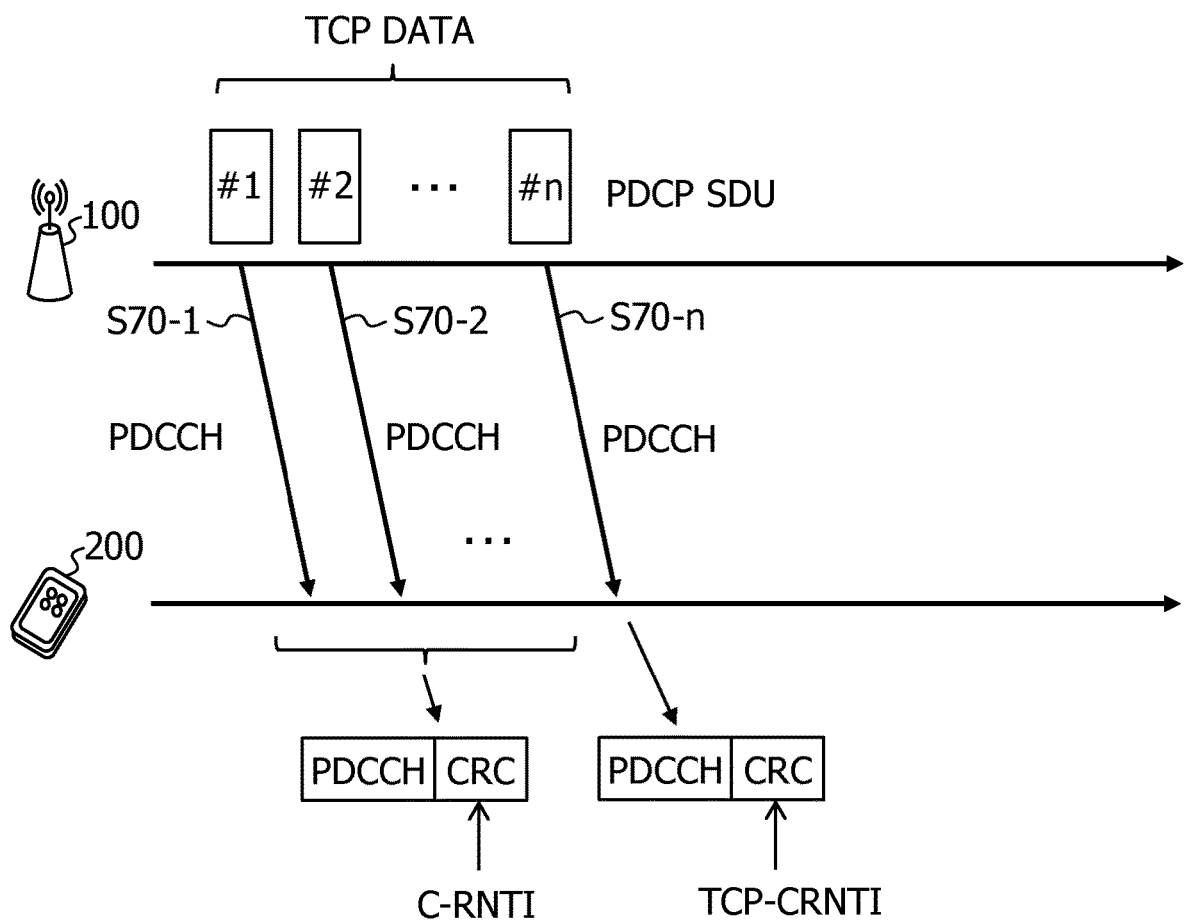
FIG. 14 is a diagram illustrating TCP-CRNTI.

FIGS. 13 and 14 are diagrams illustrating transmission examples of TCP ACK in this example. For example, certain TCP data is divided into a plurality (for example, n) of PDCP service data unit (SDU) (or packet units) and is transmitted from the base station 100 to the mobile station 200 in some cases.

In this case, the base station 100 masks (or scrambles: hereinafter referred to as "masks" in some cases) the PDCCH used to transmit a control signal for giving an instruction to transmit first PDCP SDU to (n−1)-th PDCP SDU with a cell-radio network temporary identifier (C-RNTI). Specifically, the base station 100 masks CRC added to the control signal with C-RNTI. The base station 100 transmits the control signal masked with C-RNTI using the PDCCH (S70-1, . . . , S70-(n−1) of FIG. 14). In this case, when the mobile station 200 receives the control signal masked with C-RNTI and decodes (or descrambles: hereinafter referred to as "decodes" in some cases) the control signal with C-RNTI, the mobile station 200 recognizes that the first to (n−1)-th PDCP SDUs are transmitted and recognizes that the transmission timing of TCP ACK does not come.

On the other hand, the base station 100 masks the PDCCH used to transmit the control signal for giving an instruction to transmit the final n-th PDCP SDU with a transmission control protocol-cell radio network temporary identifier (TCP-CRNTI) different from C-RNTI. Specifically, the base station 100 masks CRC added to the control signal with TCP-CRNTI. The base station 100 transmits the control signal masked with TCP-CRNTI using the PDCCH (S70 of FIG. 13 and S70-n of FIG. 14). In this case, when the mobile station 200 can receive the control signal masked with TCP-CRNTI and decode the control signal with TCP-RNTI, the mobile station 200 recognizes the final n-th PDCP SDU and recognizes that the transmission timing of TCP ACK is notified of. The control signal masked with TCP-RNTI indicates that, for example, the transmission timing of TCP ACK comes in the mobile station 200.

Then, the mobile station 200 may determine the resource position g of the PUSCH used to transmit TCP ACK based on the minimum CCE index among CCEs included in the PDCCH used to receive the control signal like (1) described above. The mobile station 200 transmits TCP ACK using the radio resource of the resource position g.

The above-described process may be executed, for example, in the control unit 104 of the base station 100 or the control unit 204 of the mobile station 200. For example, the process is executed as follows. That is, the control unit 104 analyzes a data amount of TCP data transmitted to the mobile station 200 by analyzing TCP data or a TCP header. When the data amount reaches a predetermined value and a timing at which the mobile station 200 transmits TCP ACK comes, the control unit 104 generates the control signal. The control unit 104 masks CRC added to the control signal with TCP-RNTI along with TCP-CRNTI read from the memory unit 105 and instructs the radio transmission unit 101 to transmit the control signal masked with TCP-CRNTI to the mobile station 200. The radio transmission unit 101 masks CRC of the control signal with TCP-RNTI according to the instruction and transmits the masked signal to the mobile station 200. When the radio reception unit 202 of the mobile station 200 can decode the signal using TCP-CRNTI, the radio reception unit 202 notifies the control unit 204 that the signal is decoded and the control unit 204 recognizes that a transmission timing of TCP ACK comes by the notification. The control unit 204 instructs the radio transmission unit 201 to transmit TCP ACK. The radio transmission unit 201 transmits TCP ACK to the base station 100 according to the instruction. In the process of the case of C-RNTI, the foregoing "TCP-CNTI" may be substituted with C-RNTI. In this case, when the radio reception unit 202 notifies the control unit 204 that the signal can be decoded with C-RNTI, the control unit 204 recognizes that a transmission timing of TCP ACK does not come.

In this example, the base station 100 can confirm the final PDCP SDU or the like, for example, by analyzing the TCP header or the TCP data. To reduce overhead of the analysis of the TCP header or the TCP data, only a quality of service class identifier (QCI: Qos class indicator) 6, QCI 8, or QCI 9 may be analyzed. From the viewpoint of bearers, bearers that execute the present application can also be set separate bearers. For example, a bearer that transmits data using C-RNTI and a bearer that transmits data using TCP-RNTI may be set as different bearers.

The base station 100 can estimate a timing at which TCP ACK is transmitted by the mobile station 200. For example, when the number of packets reaches a predetermined number, the control signal masked with TCP-CRNTI may be transmitted with the PDCCH at the timing.

(7) Execution of SPS for Transmitting TCP ACK

This example is an example of transmission executed using SPS at the time of transmitting TCP ACK. SPS is, for example, a scheduling scheme of allocating radio resources semi-persistently rather than allocating the radio resources dynamically for each subframe as in dynamic scheduling. In SPS, the base station 100 may transmit scheduling information to the mobile station 200 for each given period. Therefore, it is possible to achieve a reduction in overhead by transmitting the control signal.

Figure 15:
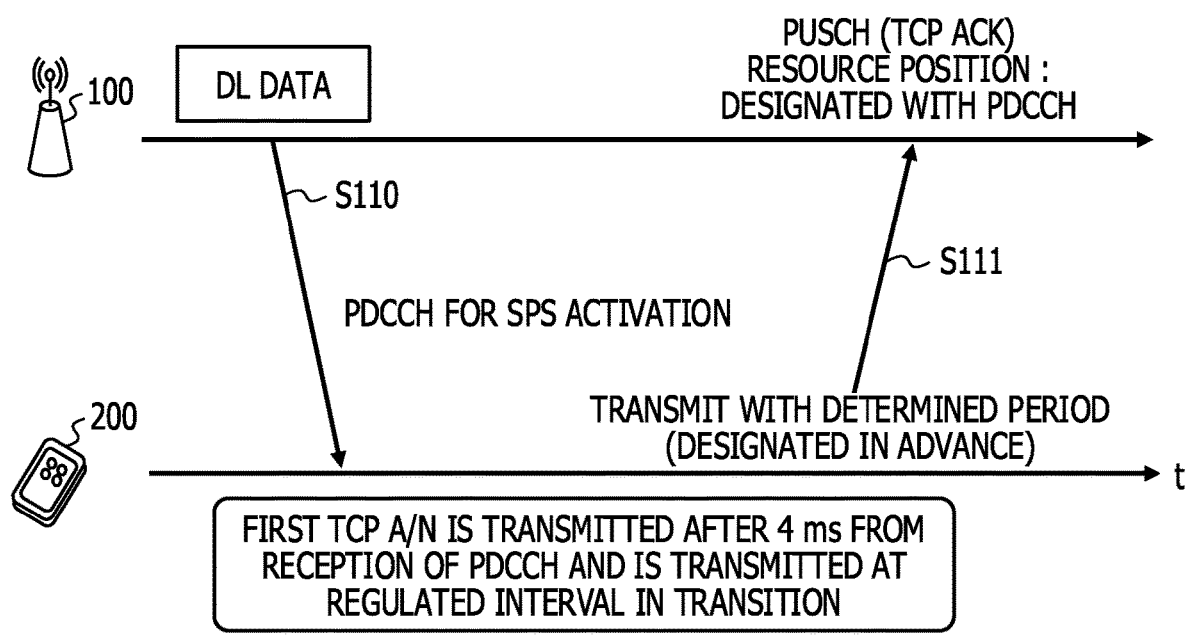
FIG. 15 is a diagram illustrating a transmission example of the TCP ACK.

FIG. 15 is a diagram illustrating a transmission example of TCP ACK in this example. When TCP data is transmitted, the base station 100 simultaneously transmits an SPS activation and executes SPS (S110). The SPS activation is, for example, information indicating that SPS is executed (or started). For example, the control unit 104 generates the SPS activation and outputs the SPS activation to the radio transmission unit 101, and the radio transmission unit 101 transmits the SPS activation using the PDCCH. At this time, the control unit 104 also generates information such as a period of SPS and transmits the information with the PDCCH via the radio transmission unit 101.

The base station 200 receives the SPS activation, thus determines to execute SPS, and transmits TCP ACK at the period received from the base station 100 using the PUSCH (S111). For example, the mobile station 200 executes the following process. That is, when the control unit 204 of the mobile station 200 receives the SPS activation and the period of SPS via the radio reception unit 202, the control unit 204 instructs the radio transmission unit 201 to transmit TCP ACK at each period. The radio transmission unit 201 transmits TCP ACK according to the instruction. In this case, the mobile station 200 may receive the SPS activation, may subsequently transmit the first TCP ACK after 4 ms, and subsequently may transmit TCP ACK at each period (or each regulated interval) of SPS.

SPS is used in some cases, for example, when the mobile station 200 transmits voice over Internet protocol (VoIP)

data. The base station 100 masks the PDCCH with which the SPS activation is transmitted with TCP-CRNT for transmission so that the VoIP data is not incorrectly transmitted in the mobile station 200. The mobile station 200 can recognize SPS by TCP ACK when the signal received with the PDCCH can be decoded with TCP-CRNTI, and can recognize that the VoIP data can be transmitted when the signal may not be decoded with TCP-CRNTI. In the process by the base station 100 and the mobile station 200 in this case, for example, the content described in (6) described above is quoted.

(8) Others

When the mobile station 200 transmits TCP ACK using the PUSCH, the mobile station 200 can also execute power control of the PUSCH. The base station 200 may calculate transmission power for the PUSCH (or TCP ACK) based on a value of transmission power control (TPC) transmitted from the base station 100 using the PDCCH. Alternatively, the mobile station 200 may calculate the transmission power based on transmission power of the PUCCH (or a signal transmitted using the PUCCH) immediately before the PUSCH with which TCP ACK is transmitted.

<Conclusion of Second Embodiment>

As described above, in the second embodiment, the mobile station 200 can transmit TCP ACK using the PUSCH without executing the scheduling request procedure (for example, S11 to S16 of FIG. 6). Accordingly, it is possible to also shorten a delay time (in the example of FIG. 6B, "11.5 ms") from occurrence of the TCP data to transmission of TCP ACK. The delay time of TCP ACK can be shortened up to about "4 ms". The throughput of TCP increases in reverse proportion to a decrease in RTT and the effect of increasing the throughput of TCP in accordance with this scheme is twice or more than when the scheduling request procedure is executed (for example, FIG. 6A).

<Nagle-Delay ACK Problem and Solutions Thereto>

Next, a Nagle-delay ACK problem and solutions thereto will be described. FIGS. 16 to 19B are diagrams illustrating the problem and solutions thereto. First, delay ACK will be described.

Figure 16:
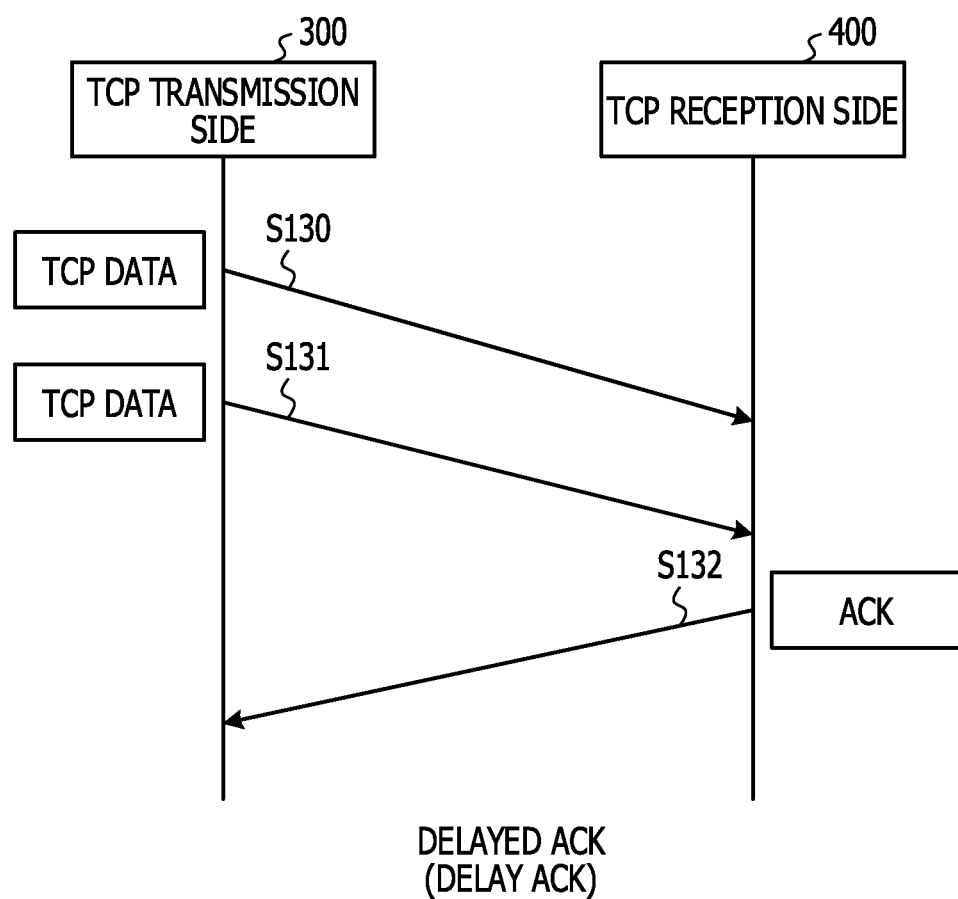
FIG. 16 is a diagram illustrating a delay ACK.

FIG. 16 is a diagram illustrating the delay ACK. As illustrated in FIG. 16, a TCP reception side 400 responds with TCP ACK when the TCP reception side 400 can normally receive TCP data transmitted from a TCP transmission side 300. In this case, when the TCP reception side 400 receives TCP data with a largest segment size or more, the TCP reception side 400 receives two segments of the TCP data (S130 and S131) and recommends transmitting TCP ACK (or executes mounting for the transmission) (S132). Since the TCP reception side 400 receives the TCP data of the two segments and transmits TCP ACK, there is the advantage of enabling an opportunity to update a TCP reception window to be given.

Figure 17:
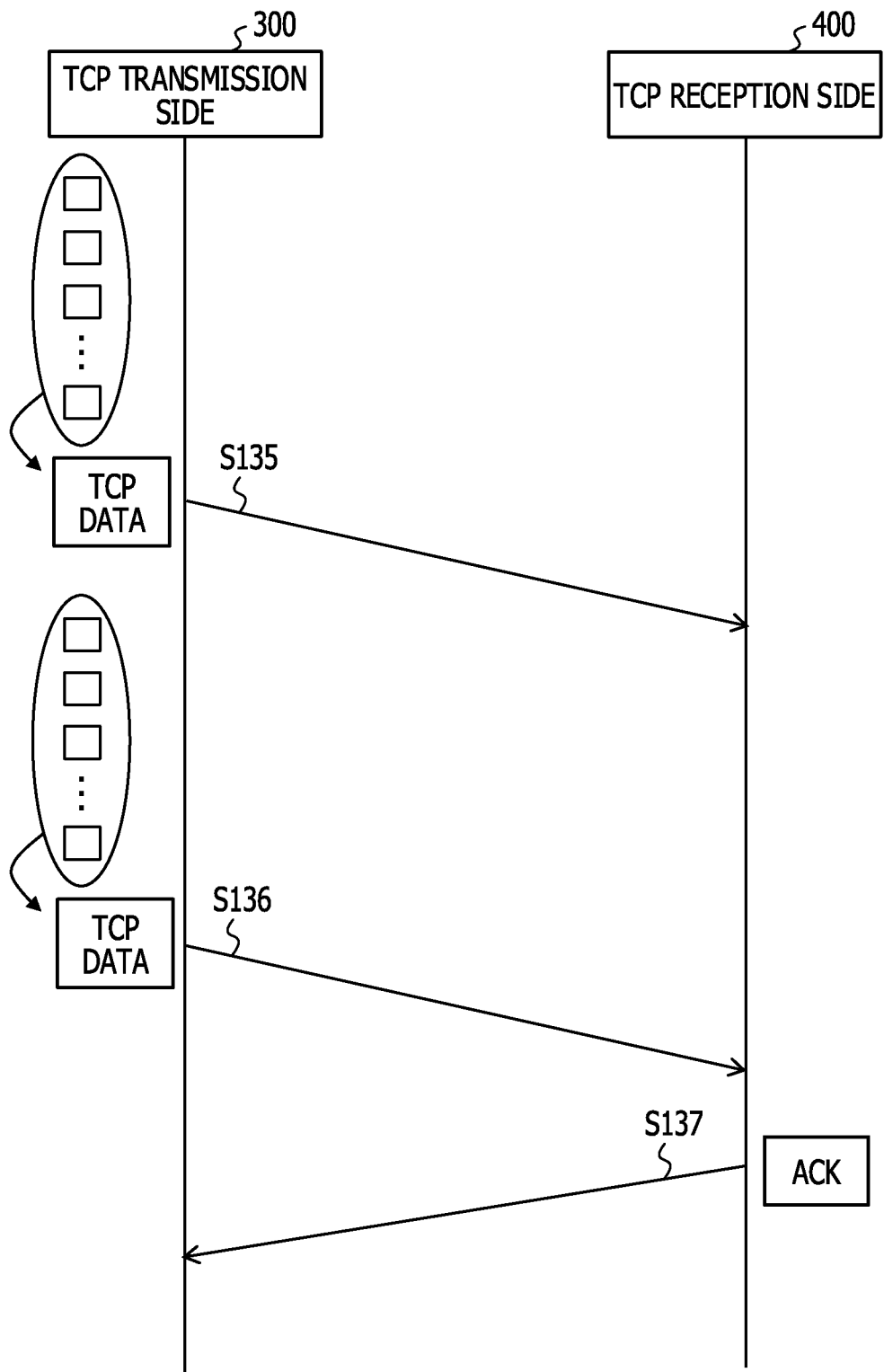
FIG. 17 is a diagram illustrating a Nagle-delay ACK problem.

FIG. 17 is a diagram illustrating the Nagle-delay ACK problem. For example, when there are many small pieces of TCP data, the TCP transmission side 300 does not the small pieces of TCP data one by one but collectively transmit the plurality of small pieces of TCP data as one piece of TCP data (S135 and S136). In this way, an algorithm for collectively transmitting the plurality of pieces of data as one piece of data is referred to as, for example, a Nagle algorithm in some cases. In this case, it takes a time equal to or greater than a given time until the TCP transmission side 300 collectively transmits the TCP data as one piece of data (S135 and S136). Then, as described in the delay ACK, in order to the TCP reception side 400 to receive the TCP data of two segments and transmit TCP ACK, it takes a considerably long time equal to or greater than a threshold until the TCP transmission side 300 receives TCP ACK in some cases. In this way, the problem that it takes a considerably long time in order for the TCP transmission side 300 to receive TCP ACK is referred to as, for example, a Nagle-delay ACK problem in some cases.

In the second embodiment, two solutions to the Nagle-delay ACK problem will be described.

Figure 18:
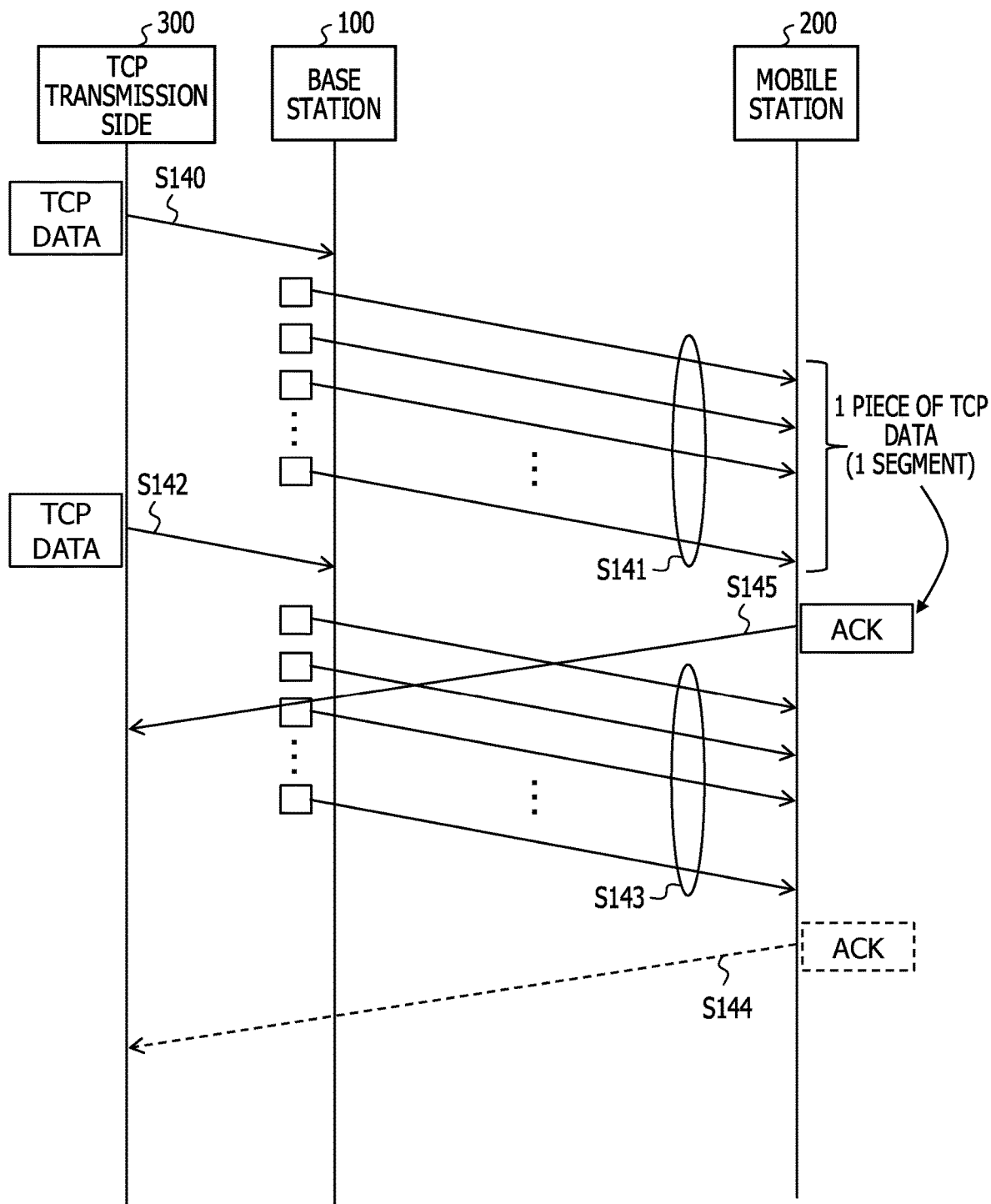
FIG. 18 is a diagram illustrating an example of a solution for the Nagle-delay ACK problem.

FIG. 18 is a diagram illustrating a first example of the solutions. In FIG. 18, the mobile station 200 is exemplified as the TCP reception side 400. When the TCP data of one segment is received from the TCP transmission side 300 (S140), the base station 100 segments the TCP data into a plurality of pieces of data to transmit the TCP data to the mobile station 200 (S141).

When the plurality of segmented pieces of data are received, the mobile station 200 stops the delay ACK. When the TCP data of one segment is received, the mobile station 200 responds with TCP ACK (S145). Thus, for example, in the TCP transmission side 300, transmission delay of TCP ACK can be shortened compared to when the mobile station 200 receives two segments and responds with TCP ACK (S144).

Figure 19A:
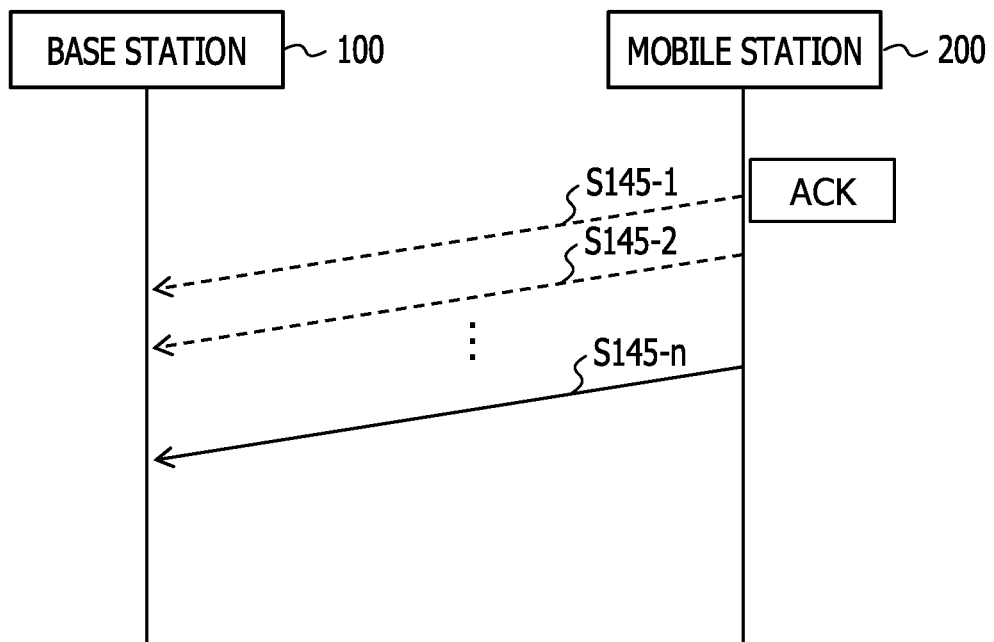
FIGS. 19A and 19B are diagrams illustrating an example of the solution for the Nagle-delay ACK problem.
Figure 19B:
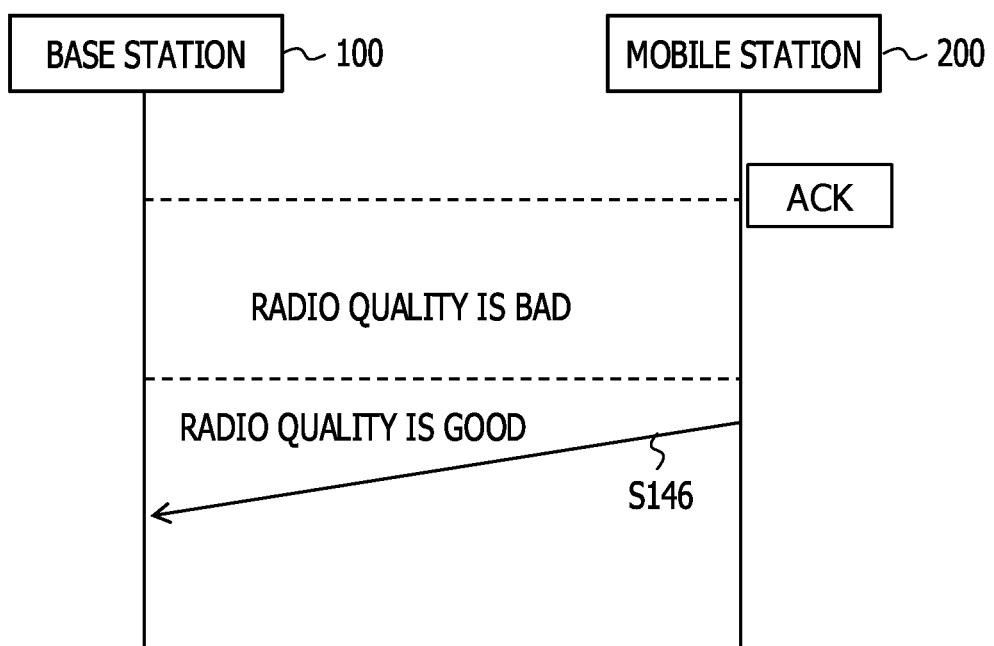

FIGS. 19A and 19B are diagrams illustrating a second example of the solutions. The second example is an example in which the mobile station 200 transmits TCP ACK when radio quality is good. For example, when the mobile station 200 transmits TCP ACK and quality of an upward radio line is not good, TCP ACK is transmitted repeatedly several times in some cases (S145-1, S145-2, ..., S145-n of FIG. 19A). In this case, in the base station 100 or the TCP transmission side 300, transmission delay of TCP ACK occurs.

Accordingly, when the radio quality is equal to or less than given quality, the mobile station 200 does not transmit TCP ACK. When the radio quality is higher than the given quality, the mobile station 200 collectively transmits TCP ACK (S146 of FIG. 19B). In the mobile station 200, TCP ACK is not transmitted several times and it is possible to achieve a reduction in power consumption of the mobile station 200.

Other Embodiments

Figure 20:
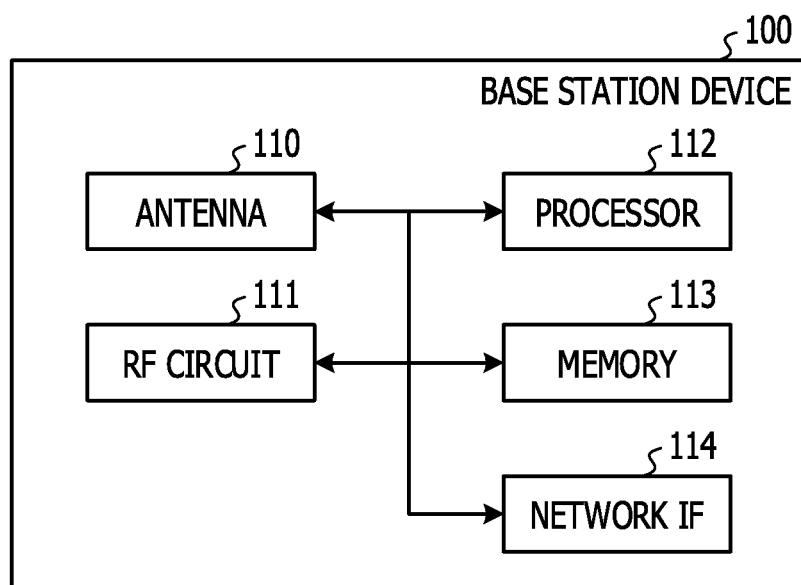
FIG. 20 is a diagram illustrating a hardware configuration example of a base station device.

FIG. 20 is a diagram illustrating a hardware configuration example of the base station 100. The base station 100 includes an antenna 110, a radio frequency (RF) circuit 111, a processor 112, a memory 113, a network interface (IF) 114. The processor 112 can realize the function of the control unit 104 by reading and executing a program stored in the memory 113. The processor 112 corresponds to, for example, the control unit 104 in the second embodiment. The antenna 110 and the RF circuit 111 correspond to, for example, the radio transmission unit 101 and the radio reception unit 102 in the second embodiment. Further, the memory 113 corresponds to, for example, the memory unit 105 in the second embodiment. Furthermore, the network IF 114 corresponds to, for example, the network communication unit 106 in the second embodiment.

Figure 21:
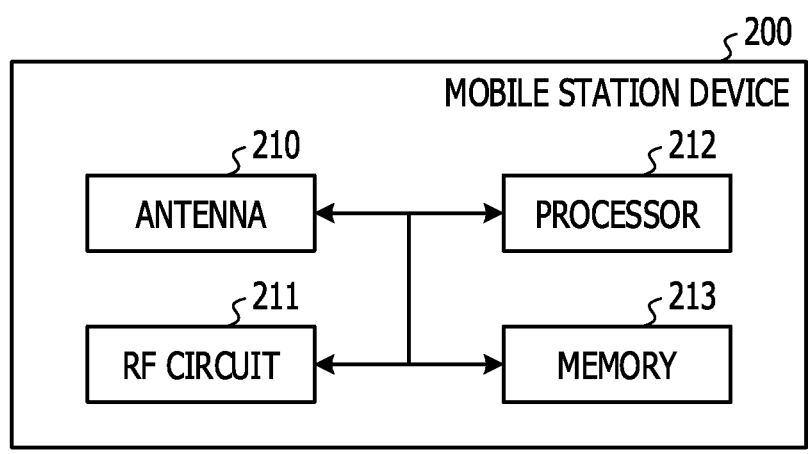
FIG. 21 is a diagram illustrating a hardware configuration example of a mobile station device.

FIG. 21 is a diagram illustrating a hardware configuration example of the mobile station 200. The mobile station 200 includes an antenna 210, an RF circuit 211, a processor 212, and a memory 213. The processor 212 can realize the function of the control unit 204 by reading and executing a program stored in the memory 213. The processor 212 corresponds to, for example, the control unit 204 in the second embodiment. The antenna 210 and the RF circuit 211 correspond to, for example, the radio transmission unit 201 and the radio reception unit 202 in the second embodiment. Further, the memory 213 corresponds to, for example, the memory unit 205 in the second embodiment.

The processors 112 and 212 may be, for example, a central processing unit (CPU), a micro processing unit (MPU), or a field programmable gate array (FPGA).

In the above-described example, the example in which the mobile station 200 determines the resource position of the PUCCH used to transmit TCP ACK based on the smallest CCE index k among CCEs allocated to the mobile station 200 has been described (for example, FIG. 9B). For example, the mobile station 200 may determine the resource position of the PUCCH used to transmit TCP ACK based on the largest CCE index among CCEs allocated to the mobile station 200. For example, the mobile station 200 may transmit TCP ACK using the radio resource of the PUCCH corresponding to the CCE index of CCE allocated to the mobile station 200.

In the above-described example, TCP has been described as an example. For example, as long as a protocol such as the stream control transmission protocol (SCTP) that transmits and receives the delivery confirmation information in a end-to-end scheme and ensures reliability of communication can be used, the above-described example can be realized. Even in this case, by realizing the above-described example, it is possible to shorten the delay time taken to transmit the delivery confirmation information in accordance with the protocol and achieve an improvement in throughput of communication using the protocol.

Further, in the above-described example, the example in which TCP ACK is mainly transmitted has been described. For example, even when the mobile station 200 transmits TCP NACK, it is possible to transmit TCP NACK as in the case in which TCP ACK is transmitted.

Combination of Embodiments

The above-described embodiments can also be combined in any manner. For example, the following combinations can be realized.

That is, the first and second embodiments can be combined to be realized. In this case, the radio communication device 500 and the first radio communication device 600 described in the first embodiment can also be realized as the base station device 100 and the mobile station device 200, described in the second embodiment, respectively. Alternatively, the radio communication device 500 and the first radio communication device 600 described in the first embodiment can also be realized as the mobile station device 200 and the base station device 100 described in the second embodiment. Accordingly, the control unit 520 in the first embodiment may correspond to the control unit 104 of the base station device 100 or the control unit 204 of the mobile station device 200 in the second embodiment. The function of the control unit 520 described in the first embodiment may be realized in the control unit 104 of the base station device 100 or the control unit 204 of the mobile station device 200.

The second embodiment and other embodiments can also be combined to be realized. In this case, the base station device 100 and the mobile station device 200 can also be realized as the base station device 100 and the mobile station device 200 described in the other embodiments, respectively. In this case, the control unit 104 according to the second embodiment in the base station device 100 may correspond to, for example, the processor 112 according to the other embodiments so that the function of the control unit 104 can be executed in the processor 112. The control unit 204 according to the second embodiment in the mobile station device 100 may correspond to, for example, the processor 212 according to the other embodiments so that the function of the control unit 204 can be executed in the processor 212.

Further, the first embodiment and other embodiments can also be combined to be realized. In this case, the radio communication device 500 and the first radio communication device 600 described in the first embodiment can also be realized as the base station device 100 and the mobile station device 200 (or the mobile station device 200 and the base station device 100) described in the other embodiments. Accordingly, the control unit 520 in the first embodiment corresponds to the processor 112 or 212 in the other embodiments so that the function of the control unit 520 can be executed in the processor 112 or 212.

All examples and conditional language recited herein of the RFID tag and the high frequency circuit are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication device comprising:
a communication circuit configured to transmit and receive a signal to and from first radio communication device; and
a control circuit configured to
cause the communication circuit to receive a radio resource control (RRC) message that includes configuration information indicating a radio resource position in a frequency axis within a shared channel,
cause the communication circuit to receive a first signal in a first layer and to receive data in a second layer different from the first layer, and
cause the communication circuit to transmit, through a first radio resource corresponding to the radio resource position indicated by the configuration information, second information after the first signal from the first radio communication device is received, the first radio resource being selected from among the shared channel without scheduling information from the first communication device, the second information being information corresponding to the data in the second layer.

2. The radio communication device according to claim 1, wherein the second information is an acknowledgement information that indicates an acknowledgement (ACK) or a negative acknowledgement (NACK) with respect to the data in the second layer,
wherein the second layer is an upper layer of the first layer, and
wherein the control circuit is configured to select the first radio resource from among a shared channel without scheduling information from the first radio communication device.

3. The radio communication device according to claim 2, wherein the second layer is a transport layer in Open Systems Interconnection (OSI) reference model.

4. The radio communication device according to claim 1, wherein the second information is a transmission control protocol acknowledgement (TCP ACK) or a TCP negative acknowledgement (NACK) and the shared channel is a physical uplink shared channel (PUSCH).

5. The radio communication device according to claim 1, wherein the control circuit is configured to
select the first radio resource after acquiring a control information in a first control channel in the first layer, the control information including one or more of indices corresponding to parameters regarding a second radio resource for the first signal, and
cause the communication circuit to transmit, on the selected first radio resource, the second information when the first signal from the first radio communication device is received.

6. The radio communication device according to claim 1, select an encoding rate and a modulation scheme after receiving a first control channel in the first layer, the first control channel including a component number indicating the number of components included in the first control channel for the radio communication device, and
cause the communication circuit to transmit the second information with the encoding rate and the modulation scheme when the signal from the first radio communication device is received.

7. The radio communication device according to claim 6, wherein the first control channel is a physical downlink control channel (PDCCH), the component is a control channel element (CCE), the number of components is an aggregation level, and a combination of the encoding rate and the modulation scheme is an MCS level.

8. The radio communication device according to claim 7, wherein the MCS level is less than a second threshold when the aggregation level is greater than a first threshold, and the MCS level is equal to or greater than the second threshold when the aggregation level is equal to or less than the first threshold.

9. The radio communication device according to claim 1, wherein a cyclic shift amount of a data decoding reference signal is a fixed value, the data decoding reference signal being a signal transmitted from the radio communication device to the first radio communication device and used when data is decoded in the first radio communication device.

10. The radio communication device according to claim 9, wherein the data decoding reference signal is a demodulation reference signal (DMRS).

11. The radio communication device according to claim 1, wherein the control circuit is configured to cause the communication circuit to transmit the second information to the first radio communication device at a predetermined timing after the first signal from the first radio communication device is received, the first signal being a part of signals in a predetermined procedure.

12. The radio communication device according to claim 11, wherein the predetermined procedure is a radio resource control (RRC) procedure.

13. The radio communication device according to claim 1, wherein the control circuit is configured to
select the first radio resource after receiving a signal in a predetermined procedure from the first radio communication device, the first radio resource being located at a predetermined position of the shared channel,
cause the communication circuit to transmit, on the first radio resource, the second information to the first radio communication device when the first signal from the first radio communication device is received.

14. The radio communication device according to claim 1, wherein the control circuit is configured to
acquire a control information in the first layer from the first radio communication device, the control information being associated with a radio resource corresponding to the radio resource position indicated by the configuration information,
wherein the transmitting of the second information is performed after the control information is received.

15. The radio communication device according to claim 14,
wherein the control signal is an activation signal,
wherein the control circuit is configured to
acquire the control information by decoding a control signal from the first radio communication device with at least any one of first identifier and second identifier,
cause the communication circuit to transmit the second information through the first radio resource when the activation signal has been masked by a first identifier,
cause the communication circuit to transmit information other than the second information through the first radio resource when the activation signal has been masked by a second identifier different from the first identifier.

16. The radio communication device according to claim 15, wherein the first identifier is a transmission control protocol-cell radio network temporary identifier (TCP-CRNTI).

17. The radio communication device according to claim 1, wherein the control circuit is configured to
acquire a control information in the first layer from the first radio communication device, the control information indicating an activation of transmitting periodically scheduling information from the first radio communication device to the radio communication device,
cause the communication circuit to transmit the second information to the first radio communication device at given periodicity after the control information is acquired.

18. The radio communication device according to claim 17, wherein the control information indicating the activation of transmitting periodically scheduling information is a control signal indicating a semi-persistent scheduling (SPS) activation.

19. A radio communication system comprising:
a first radio communication device; and
second radio communication devices,
wherein the first radio communication device includes
a first communication circuit configured to transmit and receive a signal to and from the second radio communication devices,
wherein at least one of the second radio communication devices includes
a second communication circuit configured to transmit and receive a signal to and from the first radio communication device, and a second control circuit configured to
cause the second communication circuit to receive a radio resource control (RRC) message that includes configuration information indicating a radio resource position in a frequency axis within a shared channel,
cause the second communication circuit to receive a first signal in a first layer, the first signal being configured to include data in a second layer different from the first layer, and
cause the second communication circuit to transmit, through a first radio resource corresponding to the radio resource position indicated by the configuration information, second information after the first signal from the first radio communication device is received, the first radio resource being selected from among the shared channel without scheduling information from the first communication device, the second information being information corresponding to the data in the second layer.

20. A radio communication method in a radio communication system including a first communication device and second radio communication devices, the radio communication method comprising:
causing the communication circuit to receive a radio resource control (RRC) message that includes configuration information indicating a radio resource position in a frequency axis within a shared channel;
causing a communication circuit of any of the second radio communication devices to receive a first signal in a first layer, the first signal being configured to include data in a second layer different from the first layer;
causing the communication circuit to transmit, through a first radio resource corresponding to the radio resource position indicated by the configuration information, second information after the first signal from the first radio communication device is received, the first radio resource being selected from among the shared channel without scheduling information from the first communication device, the second information being information corresponding to the data in the second layer.

* * * * *